(12) United States Patent
Singh et al.

(10) Patent No.: US 11,436,936 B2
(45) Date of Patent: Sep. 6, 2022

(54) PLATFORM FOR MANAGING ACTIVITIES

(71) Applicant: Verizon Patent and Licensing Inc., Arlington, VA (US)

(72) Inventors: Ritika Singh, San Jose, CA (US); Suresh Venkateswaran, Fremont, CA (US); Praveen Atreya, Jersey City, NJ (US); Manian Krishnamoorthy, Derry, NH (US); Ananth Kamalesan, Santa Clara, CA (US); Jose Gomez, San Francisco, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 343 days.

(21) Appl. No.: 16/009,347

(22) Filed: Jun. 15, 2018

(65) Prior Publication Data
US 2019/0325778 A1 Oct. 24, 2019

Related U.S. Application Data

(60) Provisional application No. 62/660,471, filed on Apr. 20, 2018.

(51) Int. Cl.
*G09B 19/00* (2006.01)
*G09B 5/00* (2006.01)
*H04L 67/50* (2022.01)
*G06F 3/04847* (2022.01)
*H04M 1/72463* (2021.01)

(52) U.S. Cl.
CPC ............... *G09B 19/00* (2013.01); *G09B 5/00* (2013.01); *H04L 67/535* (2022.05); *G06F 3/04847* (2013.01); *H04M 1/72463* (2021.01)

(58) Field of Classification Search
CPC ......... G09B 5/00; G09B 19/00; H04L 67/535; G06Q 30/0207–0239
See application file for complete search history.

(56) References Cited

U.S. PATENT DOCUMENTS

| | | | |
|---|---|---|---|
| 7,945,470 B1* | 5/2011 | Cohen | G06Q 10/06 705/7.13 |
| 8,378,815 B1* | 2/2013 | McNulty | G06Q 10/0833 340/539.13 |
| 8,483,738 B2* | 7/2013 | Kemery | G06F 21/6218 455/66.1 |
| 9,754,503 B2* | 9/2017 | Feng | G09B 7/00 |
| 9,830,567 B2* | 11/2017 | Weiss | G06Q 10/06311 |
| 10,229,607 B2* | 3/2019 | Baym | G07C 9/20 |
| 10,803,499 B1* | 10/2020 | Davis | G06Q 30/04 |

(Continued)

*Primary Examiner* — Peter R Egloff

(57) ABSTRACT

A network device receives first signaling from a first parent device that assigns a first task for completion by a first child, and includes a first task allotment designated by the parent for the first child's completion of the first task. The network device receives second signaling, from a first child device, indicating that the first child has completed the first task. The network device sends third signaling to the first parent device requesting approval of the completion of the first task, and receives, responsive to the third signaling, an indicator of an approval, or a rejection, from the first parent device. The network device initiates provision of the first task allotment to the first child based on receipt of the indicator of approval from the first parent device.

20 Claims, 28 Drawing Sheets

(56) References Cited

U.S. PATENT DOCUMENTS

| | | | | | |
|---|---|---|---|---|---|
| 2004/0230495 | A1* | 11/2004 | Lotvin | G09B 5/14 705/26.1 |
| 2006/0136236 | A1* | 6/2006 | Horton | G06Q 99/00 705/330 |
| 2006/0206895 | A1* | 9/2006 | Gray | G06Q 10/00 718/102 |
| 2007/0250382 | A1* | 10/2007 | Beck | G06Q 30/00 705/14.27 |
| 2008/0065456 | A1* | 3/2008 | Labedz | G06Q 10/06 709/229 |
| 2008/0189360 | A1* | 8/2008 | Kiley | H04L 67/306 709/203 |
| 2011/0070872 | A1* | 3/2011 | Ellanti | H04M 1/72457 455/414.2 |
| 2013/0080326 | A1* | 3/2013 | Jacola | G06Q 20/40 705/44 |
| 2013/0217366 | A1* | 8/2013 | Kolodziej | H04W 4/029 455/414.1 |
| 2013/0347058 | A1* | 12/2013 | Smith | G06F 21/57 726/1 |
| 2014/0122150 | A1* | 5/2014 | Davis | G06Q 10/063118 705/7.17 |
| 2014/0257954 | A1* | 9/2014 | Tan | G06Q 30/0215 705/14.17 |
| 2014/0278648 | A1* | 9/2014 | Bussey | G06Q 10/063114 705/7.15 |
| 2014/0297348 | A1* | 10/2014 | Ellis | G06Q 10/063114 705/7.15 |
| 2014/0322682 | A1* | 10/2014 | Baym | G09B 7/02 434/219 |
| 2014/0337077 | A1* | 11/2014 | Zsebedics | G06Q 10/063114 705/7.15 |
| 2015/0025951 | A1* | 1/2015 | Tan | G06Q 20/4012 705/14.17 |
| 2015/0170115 | A1* | 6/2015 | Lacek | G06Q 30/0226 705/39 |
| 2015/0199910 | A1* | 7/2015 | Patel | G09B 5/08 434/362 |
| 2015/0256467 | A1* | 9/2015 | Badiee | H04L 47/25 709/224 |
| 2015/0294389 | A1* | 10/2015 | Jones | G06K 9/00671 705/26.64 |
| 2016/0330084 | A1* | 11/2016 | Hunter | H04L 12/18 |
| 2016/0350677 | A1* | 12/2016 | Pathak | G06Q 30/0236 |
| 2016/0378549 | A1* | 12/2016 | Irish | H04L 67/1002 718/107 |
| 2017/0041454 | A1* | 2/2017 | Nicholls | H04L 41/5009 |
| 2017/0372631 | A1* | 12/2017 | Meggs | G09B 5/04 |
| 2018/0252542 | A1* | 9/2018 | Bruni | G01C 21/3453 |
| 2019/0087767 | A1* | 3/2019 | Lu | G06F 21/6218 |
| 2019/0172366 | A1* | 6/2019 | Birt | G06Q 20/2295 |
| 2019/0228669 | A1* | 7/2019 | Baym | G09B 7/02 |
| 2019/0325778 | A1* | 10/2019 | Singh | G09B 19/00 |

* cited by examiner

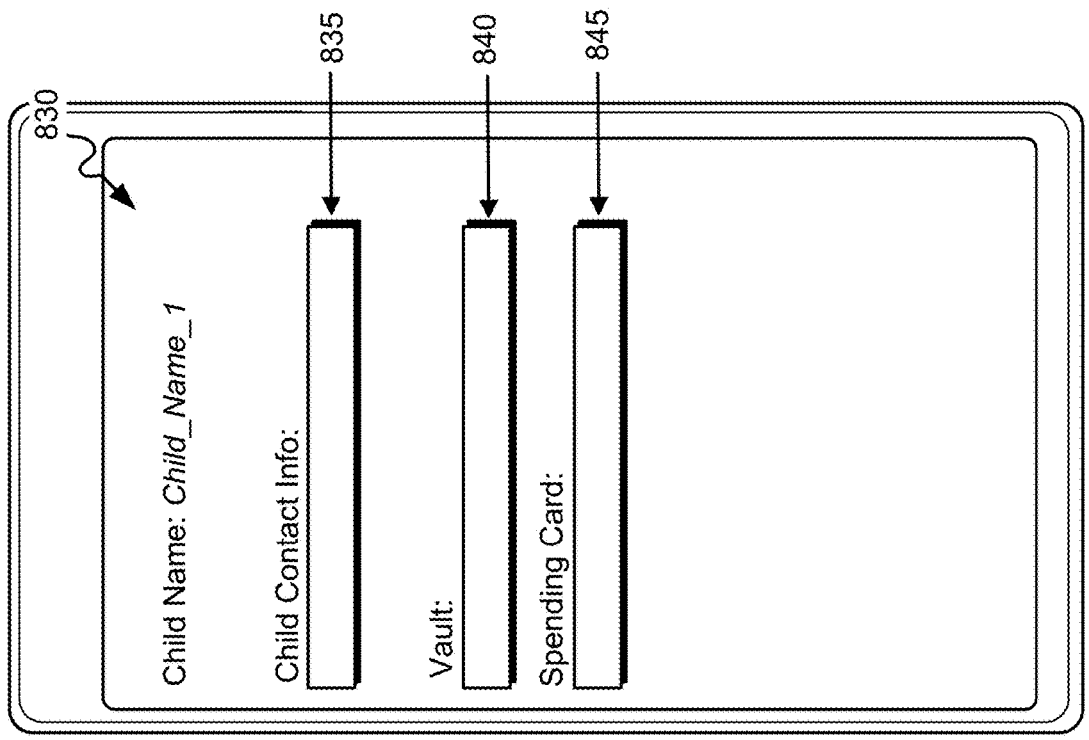
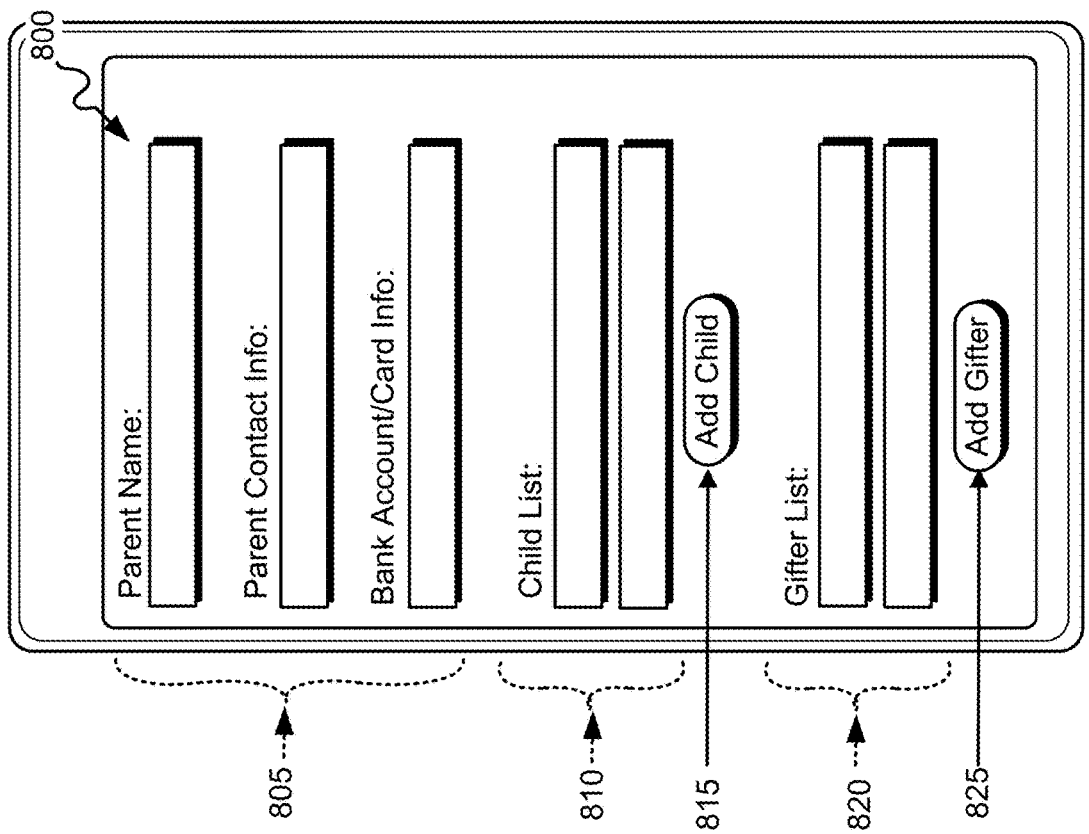
FIG. 8B
FIG. 8A

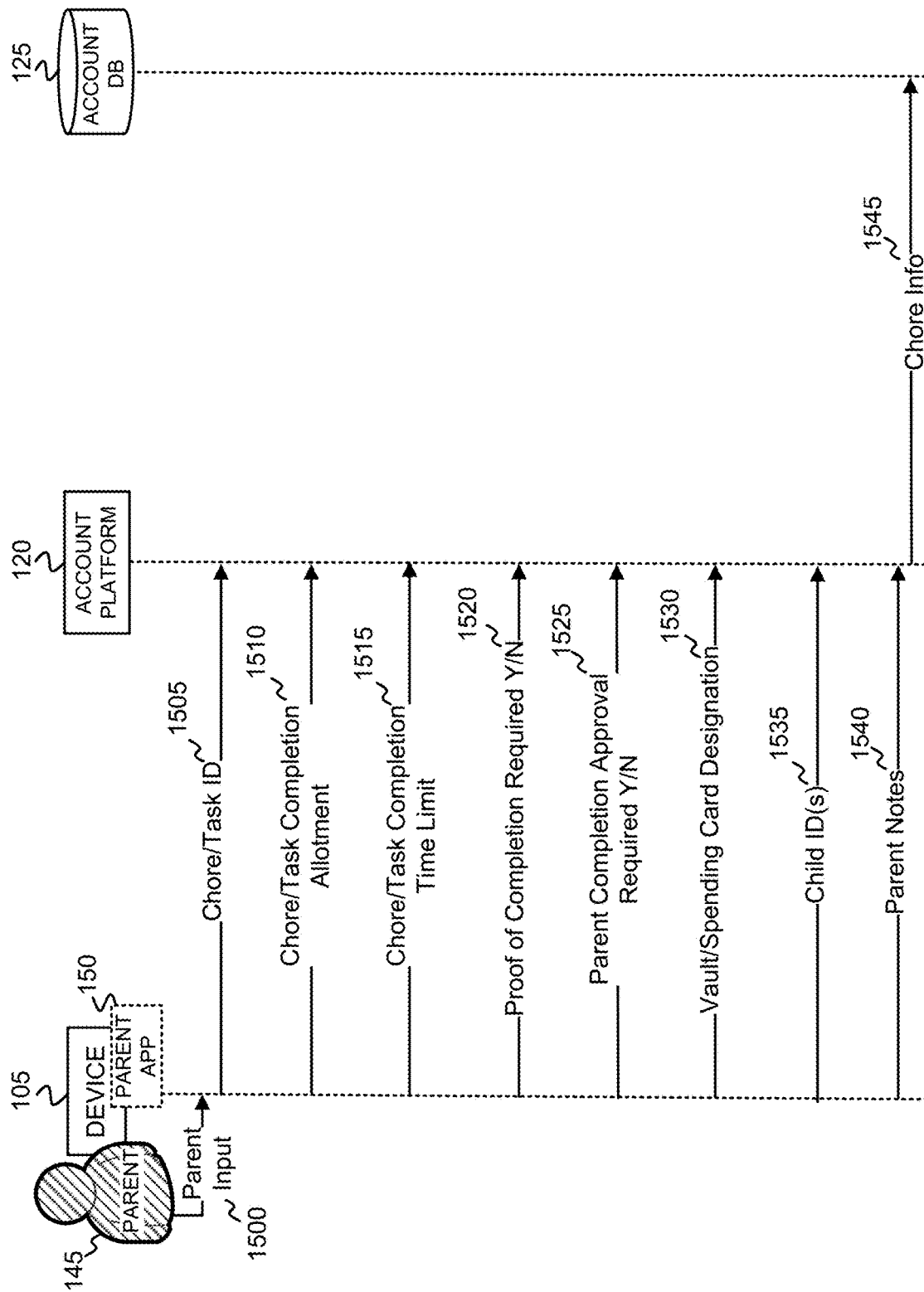

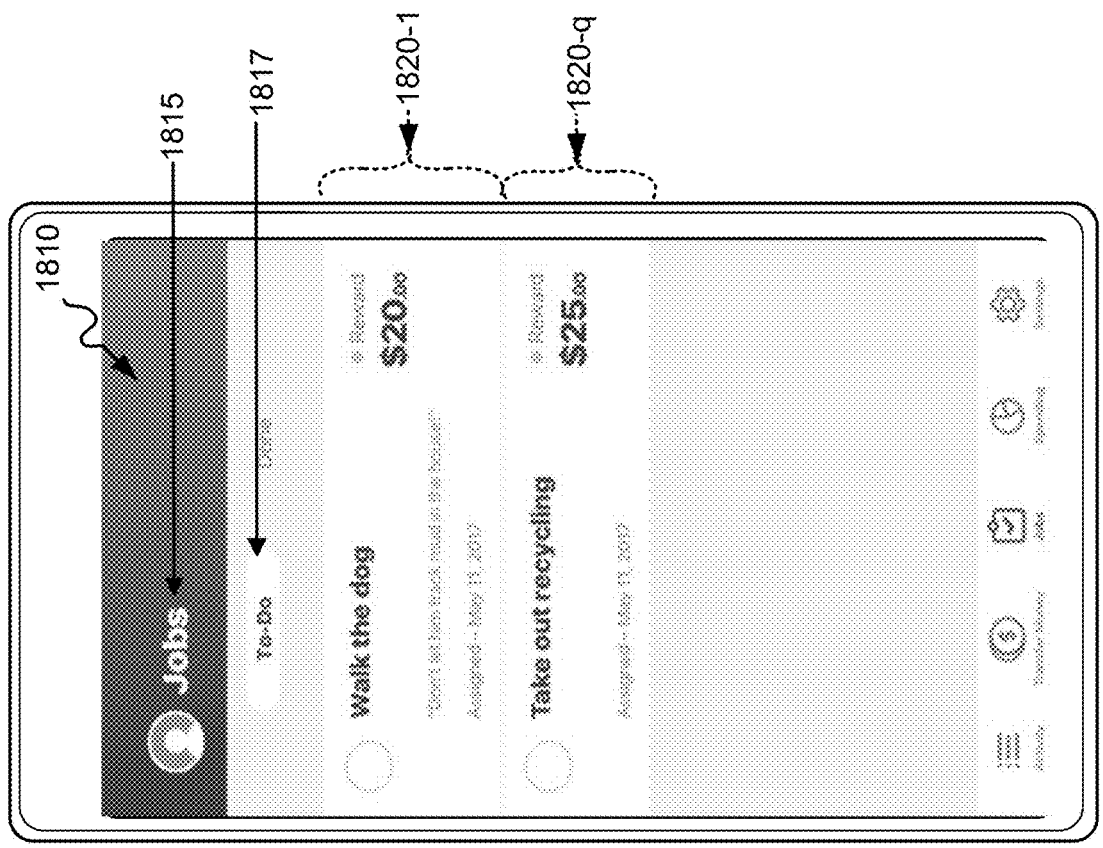
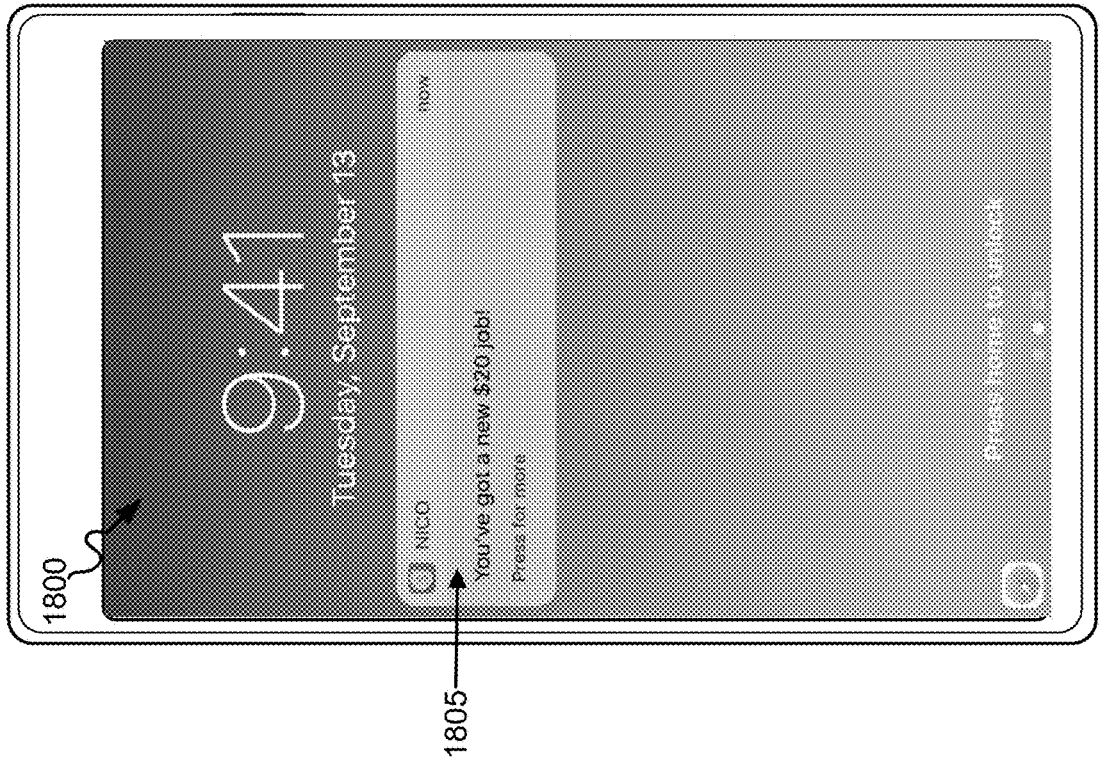
FIG. 18B
FIG. 18A

FIG. 21

PLATFORM FOR MANAGING ACTIVITIES

CROSS-REFERENCE TO RELATED APPLICATION

This application claims priority under 35 U.S.C. § 119, based on U.S. Provisional Application No. 62/660,471, filed Apr. 20, 2018, the disclosure of which is hereby incorporated by reference herein.

BACKGROUND

As children advance in age, the parents of the children typically increase the level of household responsibilities that those children have. These increased responsibilities usually include different tasks or chores for which each child is responsible. Some common household chores or tasks include, for example, taking out the garbage, cleaning a child's room, washing the dishes, feeding the dog, walking the dog, or retrieving mail from the mailbox. Often, each child in the household is assigned different chores or tasks than other children in the house. The level of difficulty of the assigned chores/tasks often is based on the age and/or maturity of each individual child. It can be difficult for both parents in a family to coordinate the assignment of chores or tasks to specific children in the family, and to manage, monitor and/or track the completion of those chores/task by the different children in the family.

BRIEF DESCRIPTION OF THE DRAWINGS

FIGS. 8A, 8B, and 8C are diagrams of exemplary device user interfaces associated with the process of FIGS. 7A and 7B;

FIG. 15 is an exemplary signaling/operations diagram associated with the process of FIG. 13;

FIGS. 18A, 18B, 18C, 18D, 18E, 18F, 18G and 18H are diagrams of exemplary device user interface displays associated with the process of FIGS. 16A and 16B;

FIG. 21 is a diagram of an exemplary device user interface display associated with the process of FIG. 19.

DETAILED DESCRIPTION OF THE PREFERRED EMBODIMENTS

Figure 1:
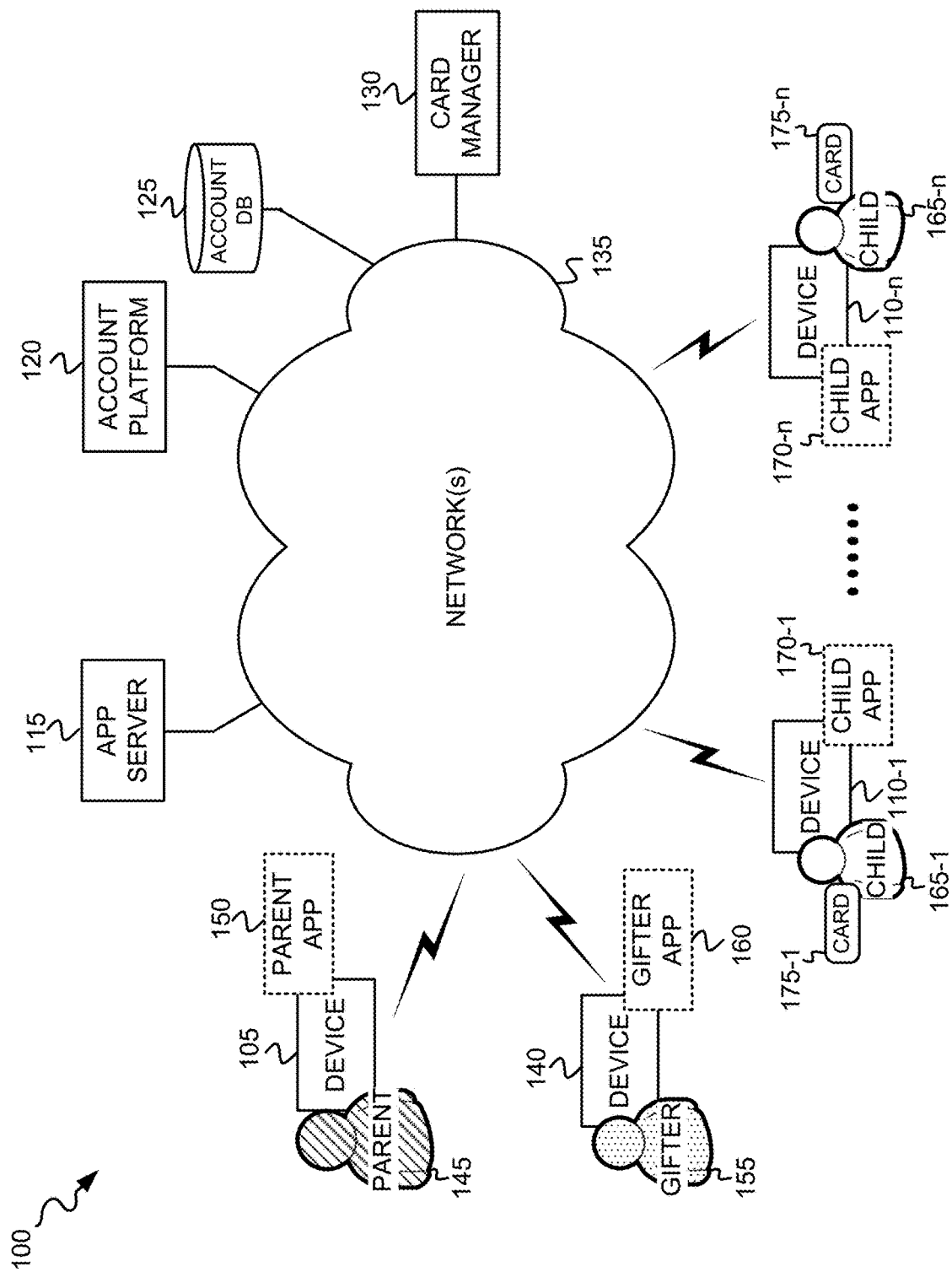
FIG. 1 depicts an exemplary network environment in which a parent creates and assigns chores or tasks to their children, and subsequently tracks the completion of those chores or tasks by their children using an application installed on the parent's electronic device.

The following detailed description refers to the accompanying drawings. The same reference numbers in different drawings may identify the same or similar elements. The following detailed description does not limit the invention.

Assignment of chores/tasks/activities to children, and managing and tracking completion of those chores/tasks/activities by parents of the children are implemented, as described herein, by a platform that interacts with applications installed on electronic devices (e.g., smart phones) carried by the parents and their children. The parent(s) may establish chores/tasks/activities managing accounts via the installed application(s), and the platform may store chores/tasks/activities assigned by those parents to their children. The platform may additionally present, via the applications installed on the children's electronic devices, the chores/tasks/activities to the children for completion. Upon completion of the assigned chores/tasks by the children, the platform may notify the parent(s) via an application(s) installed on the parent's electronic device. The chore/task/activity assignment and management functions performed by the platform, therefore, assist in the development of a level of responsibility and work ethic in children with respect to chores or tasks assigned to those children for completion by their parents.

The platform described herein enables parent assignment, management, and tracking of chores/tasks/activities for their children in a manner that also automatically ensures that the children earn an identified reward (e.g., an allotment) upon completion of a chore/task/activity. When assigning chores/tasks/activities to their child, via the parent's electronic device, a parent may further identify a particular reward that may automatically be granted to the child upon completion of the chore/task/activity. The reward may include, for example, an amount of money, an amount of cryptocurrency, an award or prize, virtual applause or acclamation, and/or a parent-designated privilege.

In implementations where the reward identified by the parent for completion of a particular chore/task/activity is an amount of money, a spending card may have been issued to, and subsequently used by, the child for spending the awarded reward money. Spending cards have become ubiquitous for the making of on-line and in-person purchases of products and services. Spending cards may include debit cards, credit cards, bank cards, or check cards, and may be used as payment cards, instead of cash, when making purchases. Spending cards are often a desirable alternative to carrying cash for the purpose of making purchases. Unlike cash, which can easily be lost or stolen, spending cards can be deactivated, if lost or stolen, to reduce or eliminate the possible resulting monetary losses. In the case, though, of parents providing spending cards for their children to use in making on-line or in-person purchases, children may not have yet developed the judgment required to manage their money, and to make judicious decisions with respect to what they buy, when they buy it, and how much money they spend. It would be desirable for parents to have the capability to easily fund, monitor, and control their child's use of a spending card, using an application installed on the parent's device, such as on the parent's mobile device (e.g., smart phone). Since the parent may carry their mobile device with them at all times, then as long as the device has network connectivity, the parent may have the capability to transfer money into, and/or out of, a spending account associated with their child, and may, at all times, use their mobile device to monitor and control purchases made by their child using the child's spending card.

The platform described herein, in addition to enabling the management of chores/tasks/activities assigned to a parent's children, and granting parent-selected rewards to the children based on completion of the chores/tasks/activities, also enables the parent to monitor and control their children's use of a spending card when the parent selected reward includes a monetary reward that is deposited in the spending card account. Parental monitoring and control of the children's spending of reward money, from the spending card account, assists in developing desirable saving and spending habits in their children.

FIG. 1 depicts an exemplary network environment 100 in which a parent creates and assigns chores or tasks to their children, and subsequently tracks the completion of those chores or task by their children using an application installed on the parent's electronic device. Network environment 100 includes a parent device 105, child devices 110-1 through 110-$n$ (where n is greater than or equal to one), an application (app) server 115, an account platform 120, an account database (DB) 125, a card manager 130, a network(s) 135, and a gifter device 140.

Parent device 105 may include any type of device that communicates over network(s) 135 via a wired or wireless connection. For example, parent device 105 may include a mobile telephone (e.g., a smart phone), a personal digital assistant (PDA), or a computer (e.g., laptop, tablet, palmtop or wearable computer). A parent 145 may be an individual that is a permanent or temporary owner, operator (i.e., user), or administrator of the parent device 105. Parent 145 may be any individual responsible for one or more children. The responsibility of parent 145 may be that of a biological or legal parent of one or more children, or the responsibility may only exist at a level of establishing, maintaining, and monitoring spending accounts assigned to the one or more children. Parent device 105 may execute a parent app 150 that performs various functions associated with parent 145 funding and monitoring a child's spending account, assigning chores/tasks to the child, monitoring and tracking completion of those chores/tasks by the child, and usage of a spending card associated with the child's spending account. Parent device 105, using parent app 150, may fund and monitor the assigned spending account, and usage of an associated spending card, of multiple different children. Parent device 105, using parent app 150, may monitor and track the completion of assigned chores/tasks to multiple different children.

Child devices 110-1 through 110-$n$ (referred to herein as "child device 110" or "child devices 110") may each include any type of device that communicates over network(s) 135 via a wired or wireless connection. For example, each child device 110 may include a mobile telephone (e.g., a smart phone), a personal digital assistant (PDA), or a computer (e.g., laptop, tablet, palmtop or wearable computer). Child devices 110-1 through 110-$n$ are each associated with respective one of children 165-1 through 165-$n$ (referred to herein as "child 165" or "children 165"). Each child 165 may be an individual that is a permanent or temporary owner, or operator (i.e., user) of a respective child device 110 and is an individual that is subsidiary to parent 145 at least from the standpoint of a spending account. As shown, each of child devices 110-1 through 110-$n$ may execute a respective one of child apps 170-1 through 170-$n$, and each of children 165-1 through 165-$n$ may be assigned a respective spending card 175-1 through 175-$n$ that is associated with that child's spending account. Each child 110 may use the child app 170 installed on child device 110 to view current balances of the child's "vault," or spending card, to monitor and perform chores/tasks assigned to child 110 by parent 145, and to transfer money from the child's vault to the child's spending card. The child's "vault," as referred to herein, includes a virtual savings account into which money may be transferred (e.g., by the child 165, the parent 145, or a gifter 155), and while stored in the virtual savings account, the money may earn interest. The parent, or the child in some implementations, may transfer money from the child's vault to the child's spending card to enable the money to be used for making purchases.

App server 115 includes one or more network devices that store apps that may be downloaded from devices 105, 110 or 140 upon request. Upon request by a device 105, 110, 140, app server 115 uploads a requested app (e.g., parent app, child app, or gifter app) to network(s) 135 for delivery to, and download by, a respective device 105, 110, or 140.

Account platform 120 includes one more network devices that perform various functions, described herein, related to a parent 145 funding and monitoring a child 165's spending account, and the parent 145 assigning specific chores/tasks to the child 165 that include an allotment being awarded to the child 165 upon the child 165 completing each of the chores/tasks. Account DB 125 includes one or more network devices that include a memory device(s) that stores data structures, such as the data structures described below with respect to FIGS. 3-6.

Card manager 130 includes one or more network devices that monitor and control use of a spending card 175 by a child 165. Money may be transferred from a child's vault to the spending card for the child 165's usage for making purchases.

Network(s) 135 may include one or more wired or wireless networks of various types including, for example, a telecommunications network (e.g., Public Switched Telephone Networks (PSTNs)), one or more wireless networks (e.g., a Public Land Mobile Network(s) (PLMN(s)), a satellite network(s)), the Internet, a wired and/or wireless local area network (LAN), a wired and/or wireless wide area network (WAN), a metropolitan area network (MAN), an intranet, or a cable network (e.g., an optical cable network).

Gifter device 140 may include any type of device that communicates over network(s) 135 via a wired or wireless connection. For example, gifter device 140 may include a mobile telephone (e.g., a smart phone), a personal digital assistant (PDA), or a computer (e.g., laptop, tablet, palmtop or wearable computer). A gifter 155 may be an individual that is a permanent or temporary owner, operator (i.e., user), or administrator of the gifter device 140. Gifter 155 may be any individual who wishes to provide gifts of money to one or more children 165 who have been assigned to a spending account monitored, managed, and controlled by a parent 145.

Gifter device 140 may execute a gifter app 160 that performs various functions associated with gifter 155 providing a monetary gift to a child 165's spending account. Gifter device 140, using gifter app 160, may provide gifts (e.g., monetary gifts), possibly with associated gifter imposed limits or controls, to multiple different children 165, with each child 165 possibly being assigned to a spending account monitored, managed, and controlled by a same, or different, parent 145.

The configuration of network components of network environment 100 is shown in FIG. 1 is for illustrative purposes. Other configurations may be implemented. Therefore, network environment 100 may include additional, fewer and/or different components that may be configured in a different arrangement than that depicted in FIG. 1. For example, though network environment 100 is depicted as including a single parent device 105 and a single gifter device 140, network environment 100 may include numerous parent devices 105 and numerous gifter devices 140.

Figure 2:
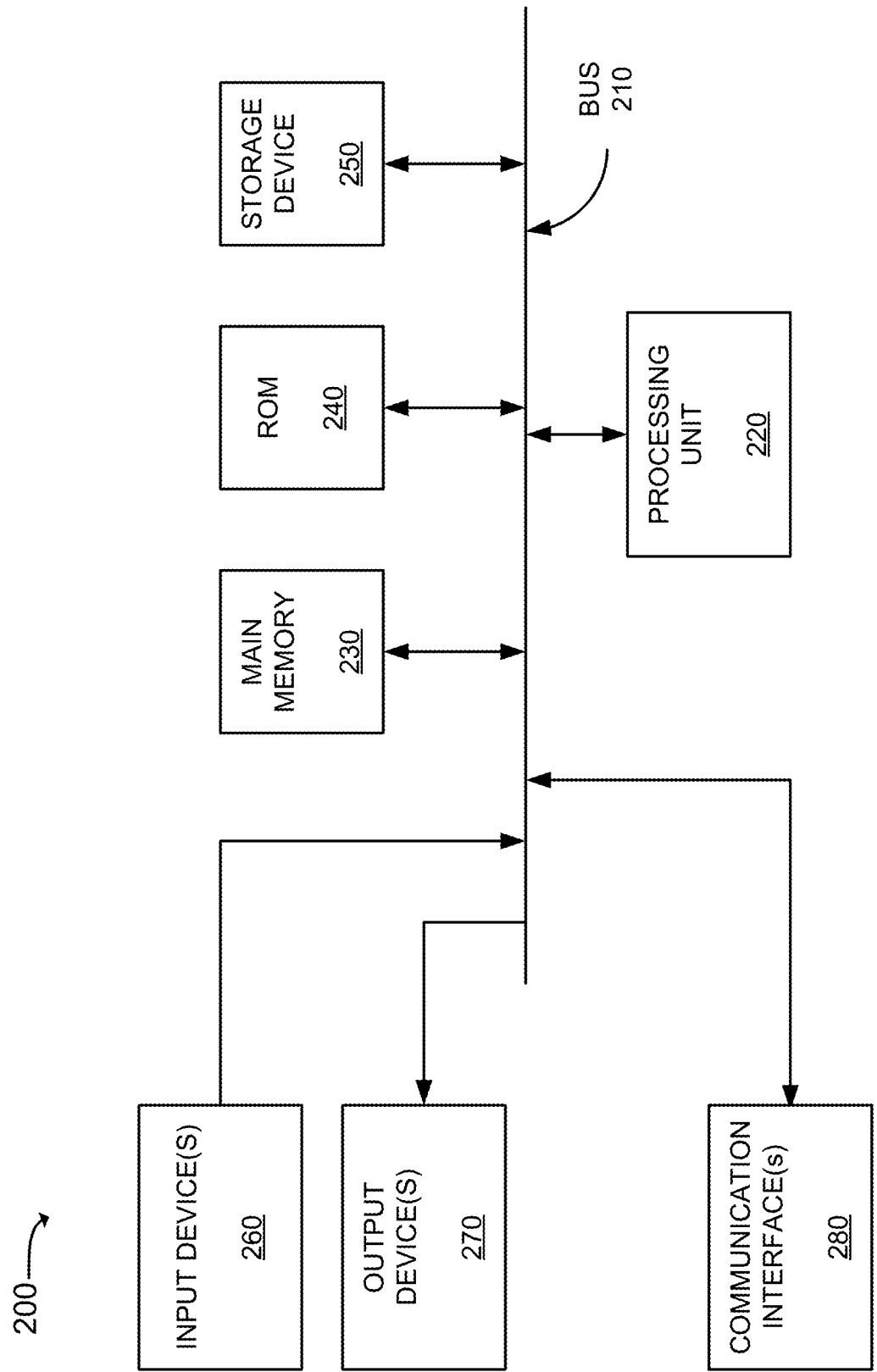
FIG. 2 is a diagram that depicts exemplary components of a device that may correspond to the devices, app server, account platform, account database, and card manager of FIG. 1.

FIG. 2 is a diagram that depicts exemplary components of a device 200. Device 105, device 110, app server 115, account platform 120, account DB 125, card manager 130, and device 140 may be configured the same as, or similar to, device 200, but possibly with some variations in components or configuration. Device 200 may include a bus 210, a processing unit 220, a main memory 230, a read only memory (ROM) 240, a storage device 250, an input device(s) 260, an output device(s) 270, and a communication interface(s) 280. Bus 210 may include a path that permits communication among the components of device 200.

Processing unit 220 may include one or more processors or microprocessors which may interpret and execute stored instructions associated with one or more processes, or processing logic that implements the one or more processes. For example, processing unit 220 may include, but is not limited to, programmable logic such as Field Programmable Gate Arrays (FPGAs) or accelerators. Processing unit 220 may include software, hardware, or a combination of software and hardware for executing the processes described herein. Main memory 230 may include a random access memory (RAM) or another type of dynamic storage device that may store information and instructions for execution by processing unit 220. ROM 240 may include a ROM device or another type of static storage device that may store static information and instructions for use by processing unit 220. Storage device 250 may include a magnetic and/or optical recording medium. Main memory 230, ROM 240 and storage device 250 may each be referred to herein as a "tangible non-transitory computer-readable medium." The process/methods set forth herein can be implemented as instructions that are stored in main memory 230, ROM 240 and/or storage device 250 for execution by processing unit 220.

Input device 260 may include one or more mechanisms that permit an operator to input information into device 200, such as, for example, a keypad or a keyboard, a display with a touch sensitive panel, voice recognition and/or biometric mechanisms, etc. Output device 270 may include one or more mechanisms that output information to the operator, including a display, a speaker, etc. Input device 260 and output device 270 may, in some implementations, be implemented as a user interface (UI) that displays UI information and which receives user input via the UI. Communication interface(s) 280 may include a transceiver that enables device 200 to communicate with other devices and/or systems. For example, communication interface(s) 280 may include a wireless transceiver(s), and associated antenna(s), for communicating via network(s) 135. As another example, communication interface(s) 280 may include a wired transceiver(s) for communicating via network(s) 135.

The configuration of components of device 200 illustrated in FIG. 2 is for illustrative purposes. Other configurations may be implemented. Therefore, device 200 may include additional, fewer and/or different components than those depicted in FIG. 2.

Figure 3:
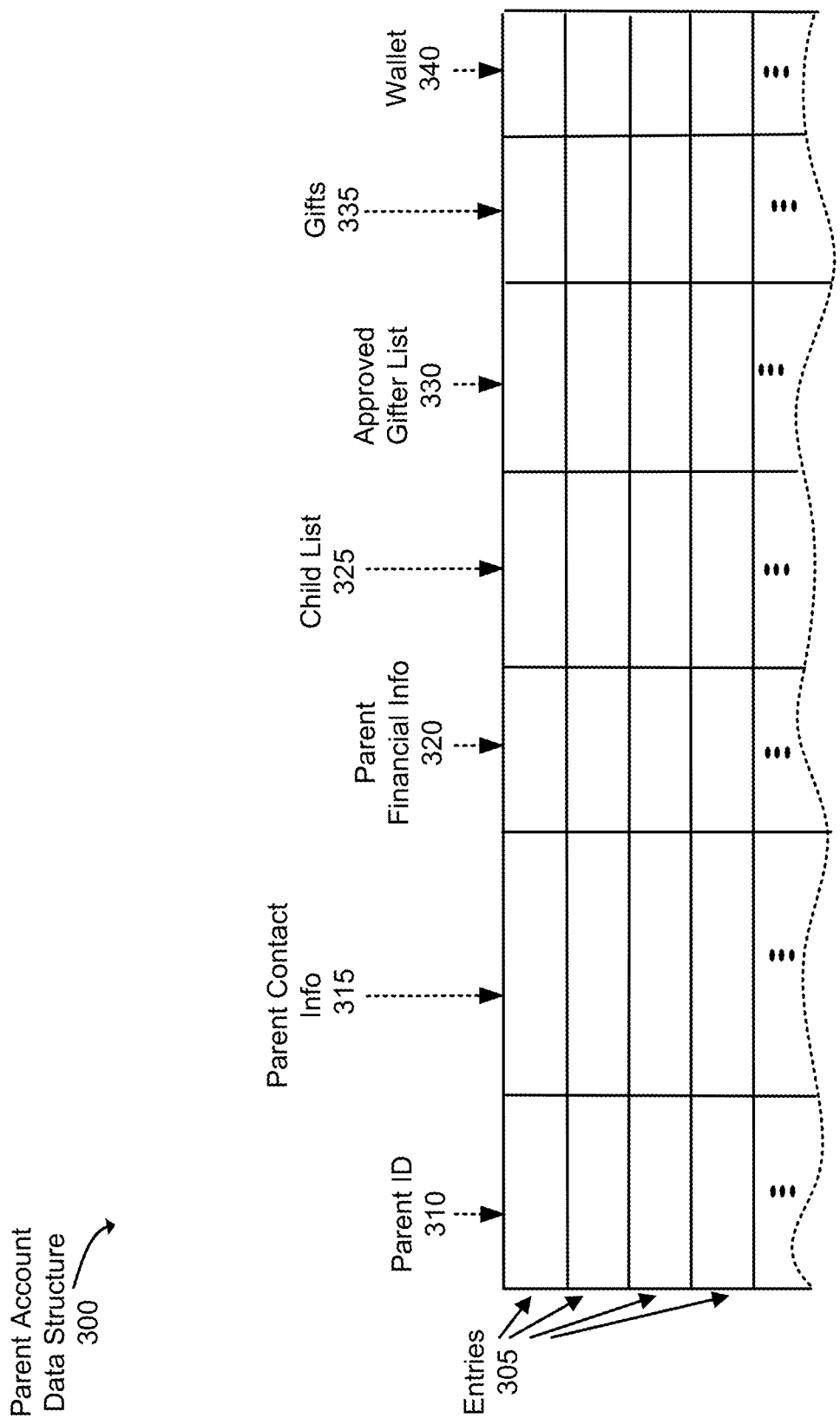
FIGS. 3-6 are diagrams that depict exemplary implementations of data structures that may be stored in the account database of FIG. 1.

FIG. 3 is a diagram that depicts an exemplary implementation of a parent account data structure 300 that may be stored in a DB, such as account DB 125. As shown, the parent account data structure 300 may include multiple entries 305, and each entry 305 may include a parent identifier (ID) field 310, a parent contact information field 315, a parent financial information field 320, a child list field 325, an approved gifter list field 330, a gifts field 335, and a wallet field 340.

Parent ID field 310 stores a unique ID for a parent 145 that is responsible for one or more children listed in child list field 325. The parent ID may be an identifier held jointly by both parents (e.g., mother and father) of a child. Parent contact information field 315 stores one or more addresses or numbers that can be used to contact the parent identified in field 310 via either text messages, emails, audio phone calls, hard copy letters, and/or instant messages. For example, field 315 may store a telephone number associated with parent device 105 for receiving text messages and/or audio messages. As another example, field 315 may store an email address associated with parent 145 such that account platform 120, gifter 155, or a child 165 may send an email to parent 145. Parent financial information field 320 stores debit card, credit card, or bank account information that can be used to transfer money from the debit card, credit card, or bank account to a spending account assigned to a child 165 listed in child list field 325 below.

Child list field 325 stores a list of unique IDs associated with one or more children 165 for which a parent 145, identified in field 310, is responsible for managing and controlling the children's spending accounts, and for assigning chores/tasks to those children. A pointer may further be stored in field 325, in association with each child 165's unique ID, where the pointer points to a particular entry in child data structure 400, described with respect to FIG. 4 below.

Approved gifter list field 330 stores a list of unique IDs associated with one or more gifters 155 who are authorized, by the parent 145 identified in field 310, to provide gifts to children listed in field 325. Gifts field 335 stores pointers that point to a particular entry in a gift data structure 600, described below with respect to FIG. 6, that is associated with a particular child 165.

Wallet field 340 stores an amount of money that has been placed by the parent 145 into the parent account for use in allocating money to the parent's childrens' vaults. The parent's children 165 may not have access to, or control of, the money transferred to the parent's wallet. For example, a parent 145 may transfer (e.g., from a bank account) $500 into the parent 145's wallet, and a value of $500 may then be stored in the wallet field 340 for the parent identified in an entry 305 having a matching parent ID stored in field 310.

To locate a particular entry 305, data structure 300 may be queried with, for example, a parent ID to locate an entry 305 having a matching parent ID stored in field 310. When such an entry 305 is located, data may be stored in one or more fields 310, 315, 320, 325, 330, 335, and/or 340 of the entry 305, or data may be retrieved from one or more of fields 310, 315, 320, 325, 330, 335, and/or 340 of the entry 305. Other fields of an entry 305, instead of parent ID field 310, may be used for querying data structure 300, such as, for example, child list field 325 or approved gifter list field 330.

Figure 4:
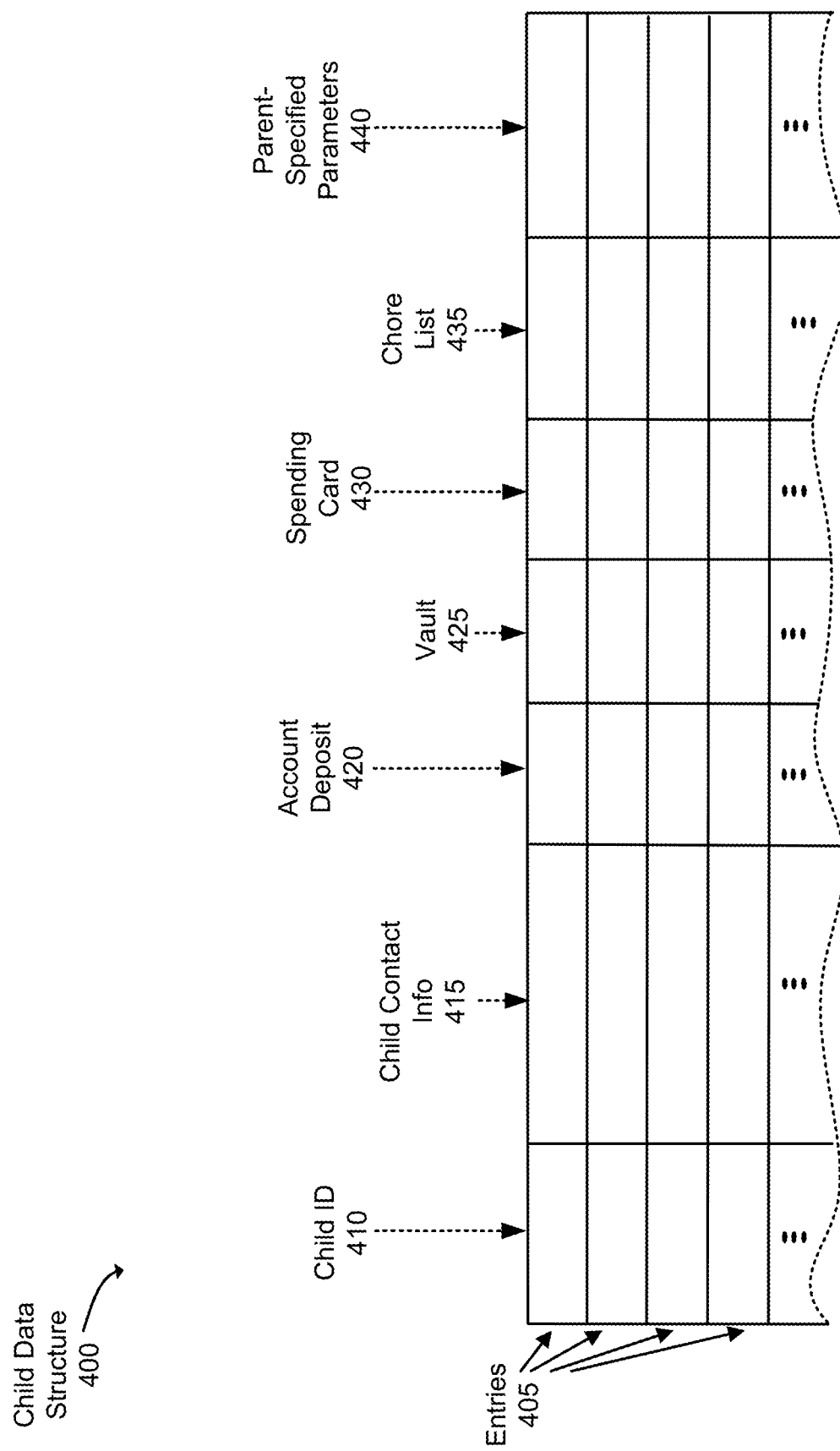

FIG. 4 is a diagram that depicts an exemplary implementation of a child data structure 400 that may be stored in a DB, such as account DB 125. As shown, the child data structure 400 may include multiple entries 405, and each entry 405 may include a child ID field 410, a child contact information field 415, an account deposit field 420, a vault field 425, a spending card field 430, a chore list field 435, and a parent-specified parameters field 440.

Child ID field 410 stores a unique ID associated with a child 165. Child contact information field 415 stores one or more addresses or numbers that can be used to contact the child identified in field 410 via either text messages, emails, audio phone calls, and/or instant messages. For example, field 415 may store a telephone number associated with a child device 110 that can be used to send a text message or an audio message to the child 165 identified in field 410.

Account deposit field 420 stores a total amount of money that parent 145, and possibly one or more gifters 155, have deposited in the child 165's spending account.

Vault field 425 stores an amount of money that has been allocated, from the total amount of money in the child 165's spending account stored in field 420, to the child 165's vault. Money stored in the vault may earn interest (as specified by the parent 145) as long as the money resides in the vault, or may be used by the child 165 for making purchases via use of the child 165's spending card 175.

Spending card field 430 stores an amount of money that has been allocated to the child's spending card 175 for use in making purchases. The parent 145 and/or the child 165 may transfer money from the child 145's vault (i.e., vault field 425), onto the child 145's spending card 175 (i.e., spend card field 430).

Chore list field 435 stores a pointer to a chore list data structure 500 that is associated with the child identified in child ID field 410. Chore list data structure 500, as described below with respect to FIG. 5, stores a list of chores assigned, by a parent 145, to the child identified in field 410. Parent-specified parameters field 440 store one or more parameters that the parent 145 specifies in regards to the child identified in field 410. For example, the parent-specified parameters may include vendor/merchant controls, per-purchase spending limits, vault to spending card transfer limits types of purchases controls (e.g., restrictions on categories of purchases that may be made by the child 165 using the spending card 175), parent purchase approval controls, recurring allowance payments, and vault interest rates. Parent notes field 545, described below with respect to FIG. 5, stores parent notes associated with each chore in the chore list. The parent notes may include the comments or textual instructions of parent 145 that assigns the chore of the chore list to the child identified in field 410.

To locate a particular entry 405, data structure 400 may be queried with, for example, a child ID to locate an entry 405 having a matching child ID stored in field 410. When such an entry 405 is located, data may be stored in one or more fields 410, 415, 420, 425, 430, 435, and/or 440 of the entry 405, or data may be retrieved from one or more of fields 410, 415, 420, 425, 430, 435, and/or 440 of the entry 405. Other fields of an entry 405, instead of child ID field 410, may be used for querying data structure 400, such as, for example, chore list field 435 or parent-specified parameters field 440.

Figure 5:
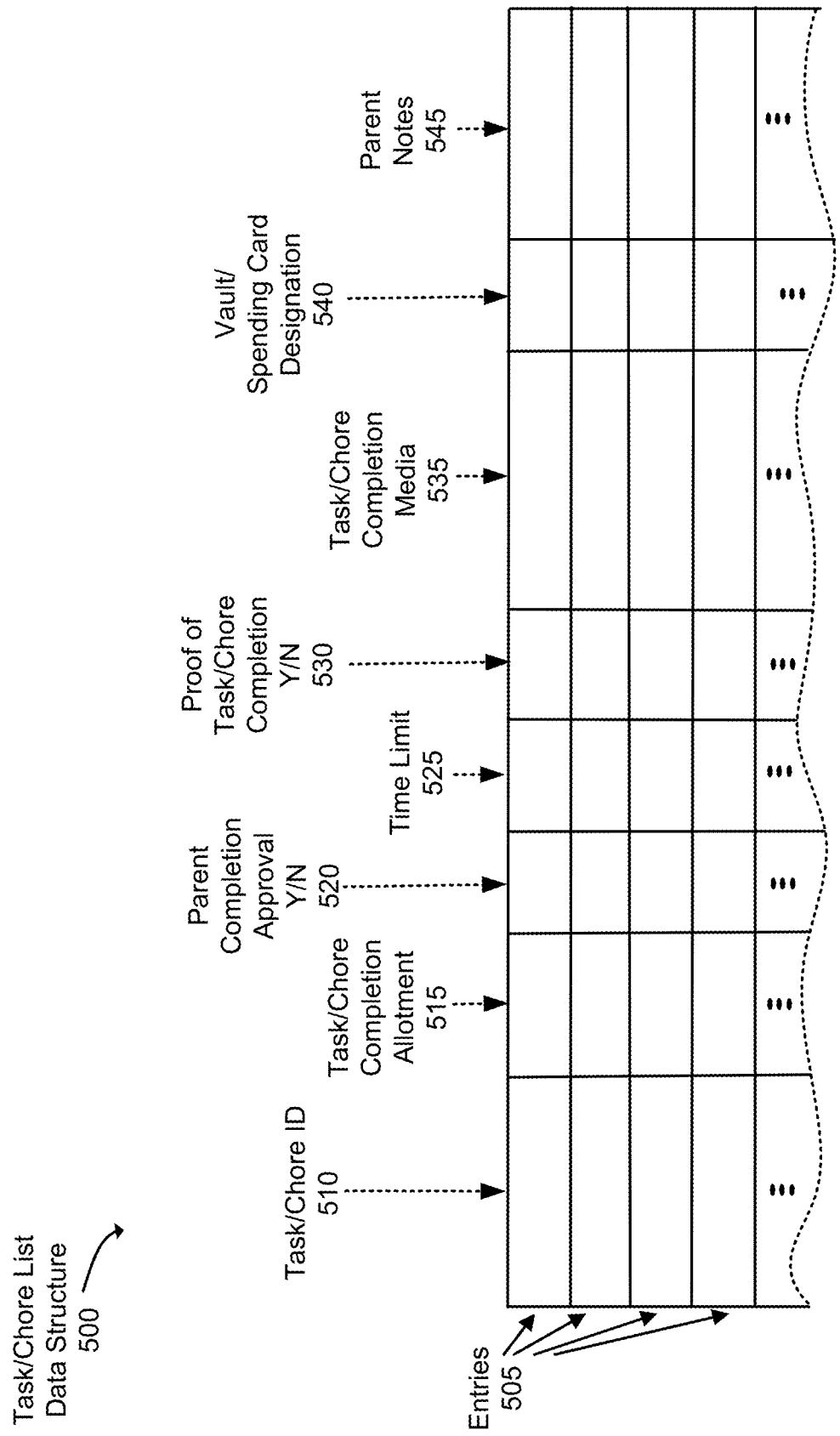

FIG. 5 is a diagram that depicts an exemplary implementation of a task/chore list data structure 500 that may be stored in a DB, such as account DB 125. A different task/chore list data structure 500 may be stored in account DB 125 for each different child 165 having an assigned spending account. As shown, task/chore list data structure 500 may include multiple entries 505, and each entry 505 may include a task/chore ID field 505, a task/chore completion allotment field 515, a parent completion approval field 520, a time limit field 525, a proof of task/chore completion field 530, a task/chore completion media field 535, a vault/spending card designation field 540, and a parent notes field 545.

Task/Chore ID field 505 stores a unique ID associated with a chore/task/activity assigned to a particular child 165. The unique ID may include, for example, a textual label associated with a particular chore/task/activity (e.g., "garbage, take out") and/or a numeric or alphanumeric ID associated with the particular chore/task/activity. Task/Chore completion allotment field 515 stores an allotment that is to be allocated to the child 165 upon successful completion of the chore/task/activity identified in field 510. The allotment may include an amount of money, an amount of cryptocurrency, an award or prize, virtual applause or acclamation, a parent-designated privilege, etc. Parent completion approval field 520 stores an indicator of whether parent approval of completion of the chore/task/activity identified in field 510 is required before the allotment specified in field 515 is allocated to the child 165.

Time limit field 525 stores a period of time, or a particular date and/or time, that acts as a limit on when the chore/task/activity identified in field 510 may be completed. For example, a particular date and time one week into the future may be stored in field 525, and the child 165 must complete the chore/task/activity within that time period to be allocated the allotment identified in field 515.

Proof of task/chore completion field 530 stores an indicator (e.g., Yes (Y) or No (N)) of whether proof that the chore/task/activity has been completed by the child 165 needs to be obtained before the allotment identified in field 515 is allocated to the child 165. The proof may include, for example, media proof (e.g., audio, image, video) that includes evidence that the child 165 successfully performed the chore/task/activity. Task/Chore completion media field 535 stores media a media file, such as an audio file, an image file, and/or a video file, that includes certain evidence that the child 165 successfully performed the chore/task/activity. In some implementations, parent app 150 may automatically review task/chore completion media stored in field 535 and automatically determine whether the task/chore/activity has been completed, as described in more detail below.

Vault/spending card designation field 540 stores an indicator of whether the allotment identified in field 515, when the allotment is monetary in nature, is to be deposited in the child 165's vault, or transferred to the child 165's spending card 175. Parent notes field 545 stores parent notes associated with the task/chore identified in field 510. The parent notes may include the comments or textual instructions, related to the chore/task, of the parent 145 that assigned the chore/task identified in field 410 to the child 165.

To locate a particular entry 505, data structure 500 may be queried with, for example, a task/chore ID to locate an entry 505 having a matching task/chore ID stored in field 510. When such an entry 505 is located, data may be stored in one or more fields 510, 515, 520, 525, 530, 535, 540, and/or 545 of the entry 505, or data may be retrieved from one or more of fields 510, 515, 520, 525, 530, 535, 540, and/or 545 of the entry 505. Other fields of an entry 505, instead of task/chore ID field 510, may be used for querying data structure 500, such as, for example, task/chore completion award field 515.

Figure 6:
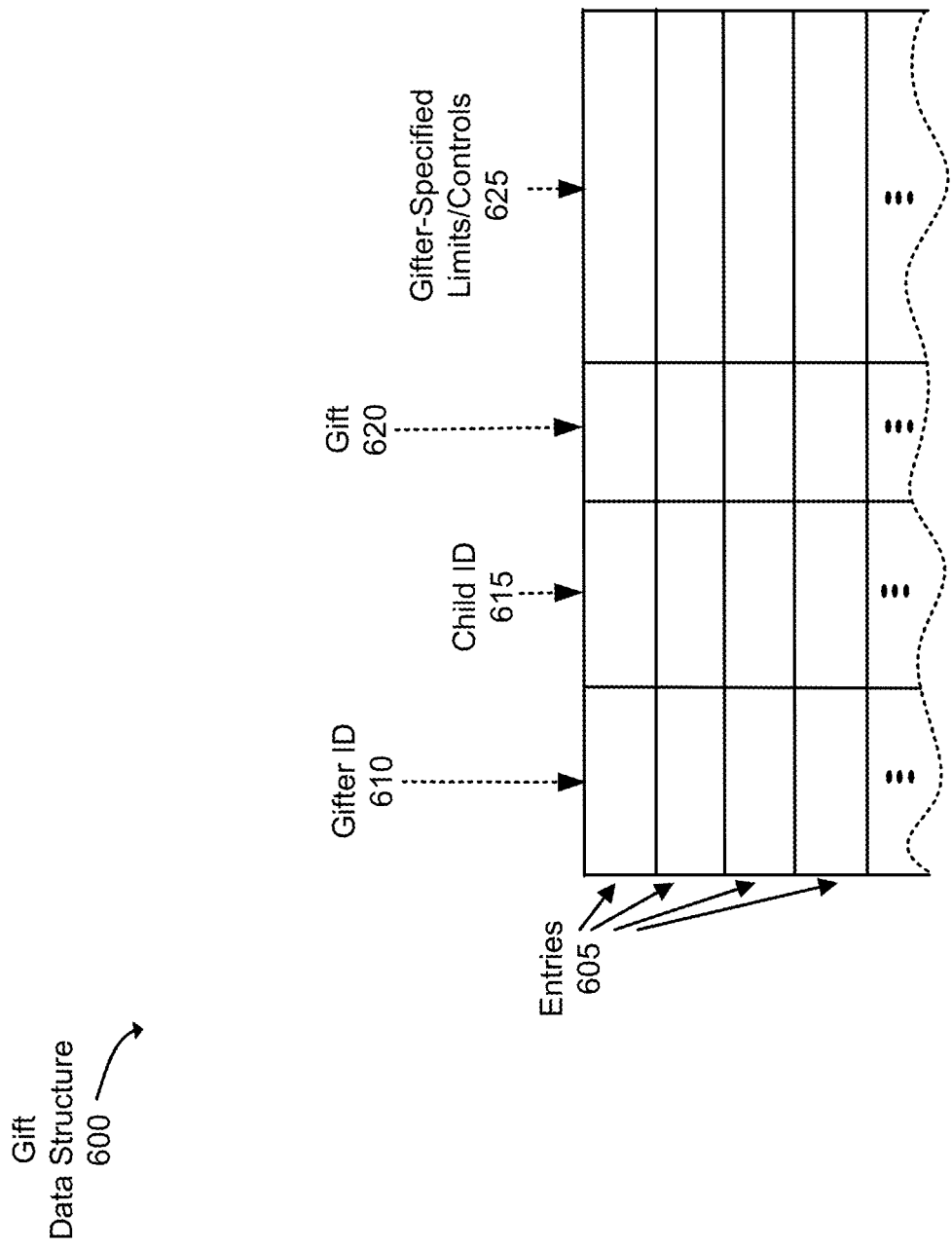

FIG. 6 is a diagram that depicts an exemplary implementation of gift data structure 600 that may be stored in a DB, such as account DB 125. As shown, the gift data structure 600 may include multiple entries 605, and each entry 605 may include a gifter ID field 610, a child ID field 615, a gift amount field 620, and a gifter-specified limits/controls field 625.

Gifter ID field 610 stores a unique ID for an individual (a gifter) that provides a monetary gift to a child identified in child ID field 615. Child ID field 615 stores the unique ID of the child 165 receiving a gift from the gifter identified in field 610. Gift field 620 stores information that identifies the gift that the gifter identified in field 610 has gifted to the child 165 identified in field 615. The gift may include an allotment that may further include an amount of money, an amount of cryptocurrency, an award or prize, virtual applause or acclamation, a gifter-designated privilege, etc. Gifter-specified limits/controls field 625 stores data associated with one or more gifter-specified limits or controls on use of the monetary gift identified in field 620. For example, the gifter-specified limits/controls field 625 may store parameters that apply controls to the vendors/merchants that the child 165 may use when spending money from a monetary gift, per-purchase spending limits when spending money from a monetary gift, types of purchases controls (e.g., restrictions on categories of purchases that may be made by the child 165 using a monetary gift, and gifter purchase approval controls (e.g., the gifter may require approval of purchases made using a monetary gift).

To locate a particular entry 605, data structure 600 may be queried with, for example, a gifter ID to locate an entry 605 having a matching gifter ID stored in field 610. When such an entry 605 is located, data may be stored in one or more fields 610, 615, 620, and/or 625 of the entry 605, or data may be retrieved from one or more of fields 610, 615, 620, and/or 625 of the entry 605. Other fields of an entry 605, instead of gifter ID field 610, may be used for querying data structure 600, such as, for example, child ID field 615.

Parent account data structure 300, child data structure 400, chore list data structure 500, and gift data structure 600 are depicted in FIGS. 3-6 as including tabular data structures with certain numbers of fields having certain content. The tabular data structures shown in FIGS. 3-6, however, are for illustrative purposes. Other types of data structures may alternatively be used. The number, types, and content of the entries and/or fields in the data structures illustrated in FIGS. 3-6 are also for illustrative purposes. Other data structures having different numbers of, types of and/or content of, the entries and/or the fields may be implemented. Therefore, data structures 300, 400, 500, and 600 may include additional, fewer and/or different entries and/or fields than those depicted in FIGS. 3-6.

Figure 7A:
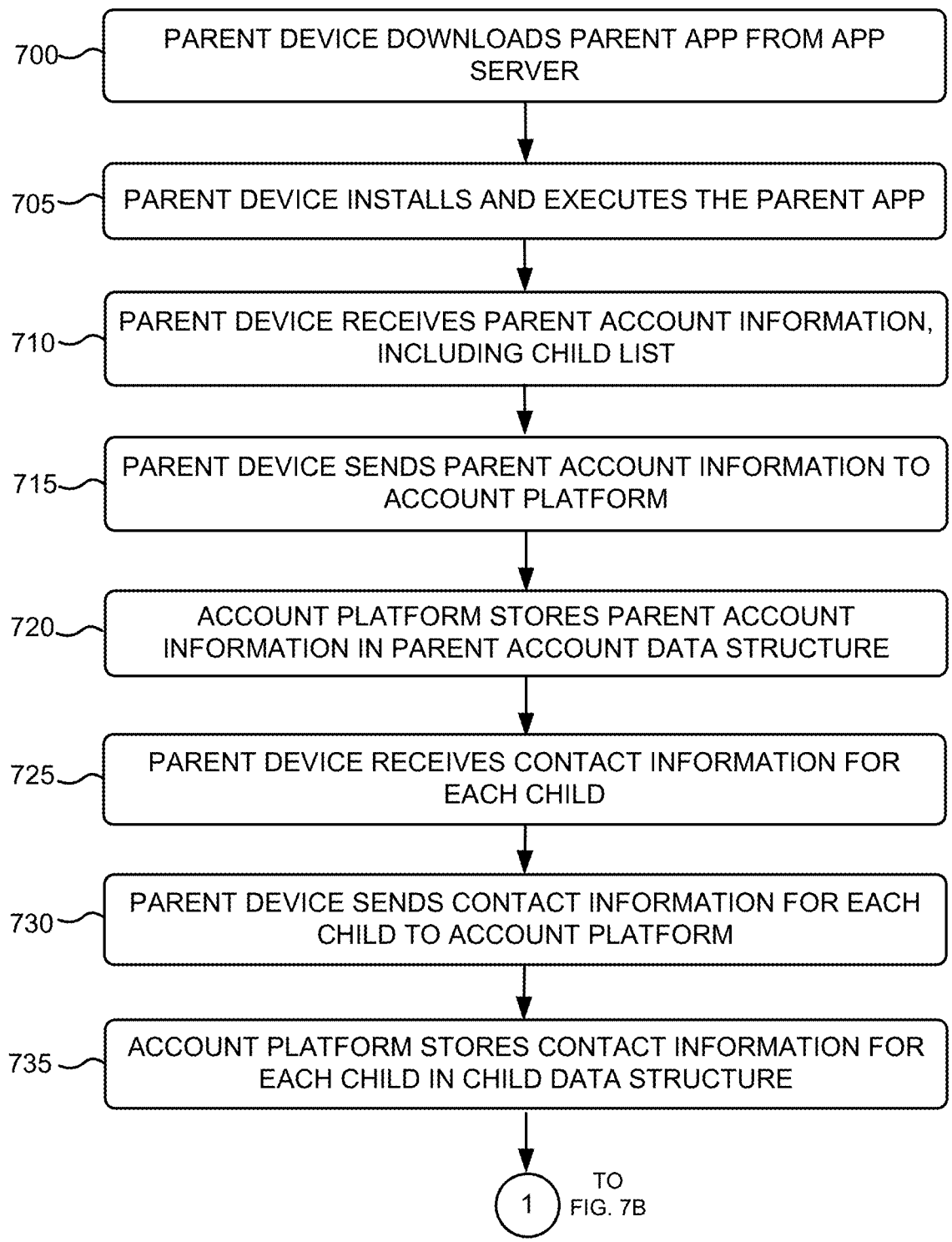
FIGS. 7A and 7B are flow diagrams of an exemplary process for a parent to use a parent device to establish a chore/task/activity managing account for one or more children of the parent.
Figure 7B:
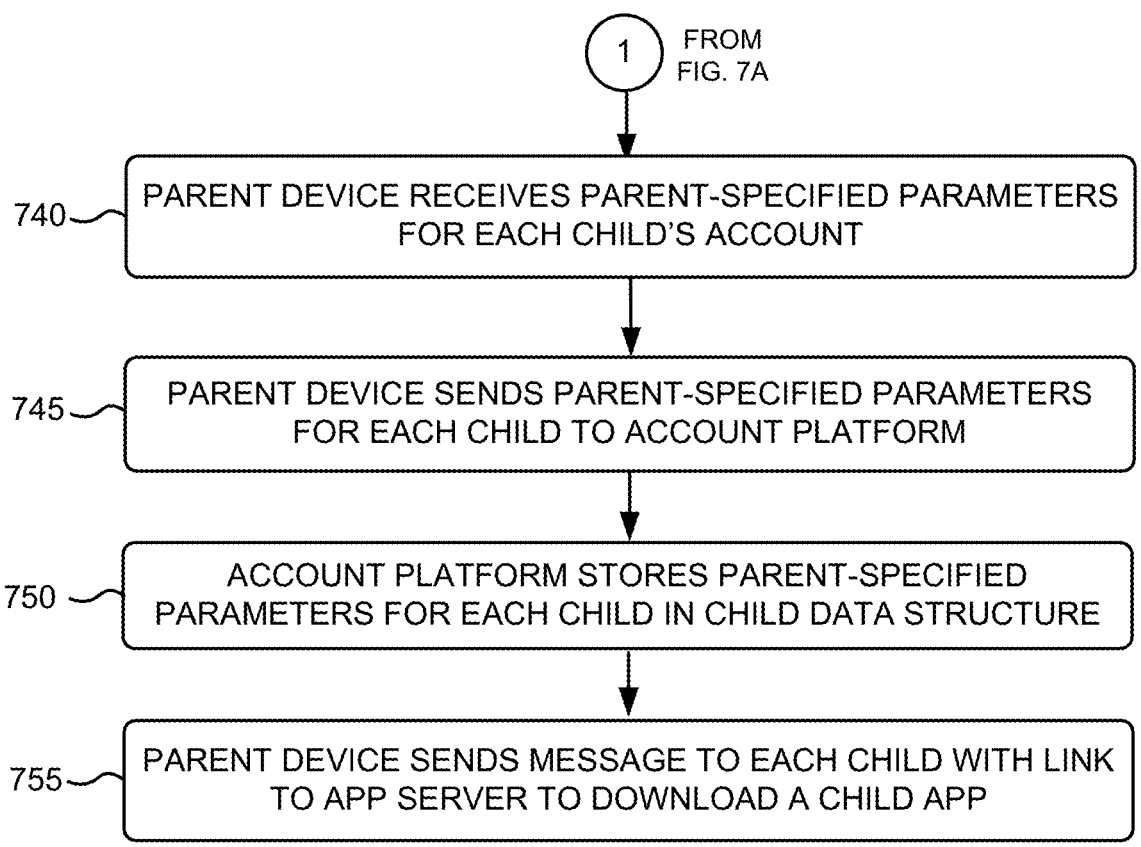

FIGS. 7A and 7B are flow diagrams of an exemplary process for a parent 145, using a parent device 105, to establish a chore/task/activity managing account for one or more children 165. In one implementation, the exemplary process of FIGS. 7A and 7B may be executed by parent device 105, in conjunction with account platform 120 and account DB 125. The exemplary process of FIGS. 7A and 7B is described below with reference to the user interface diagrams of FIGS. 8A-8C, and the signaling/operations diagram of FIG. 9.

Figure 9:
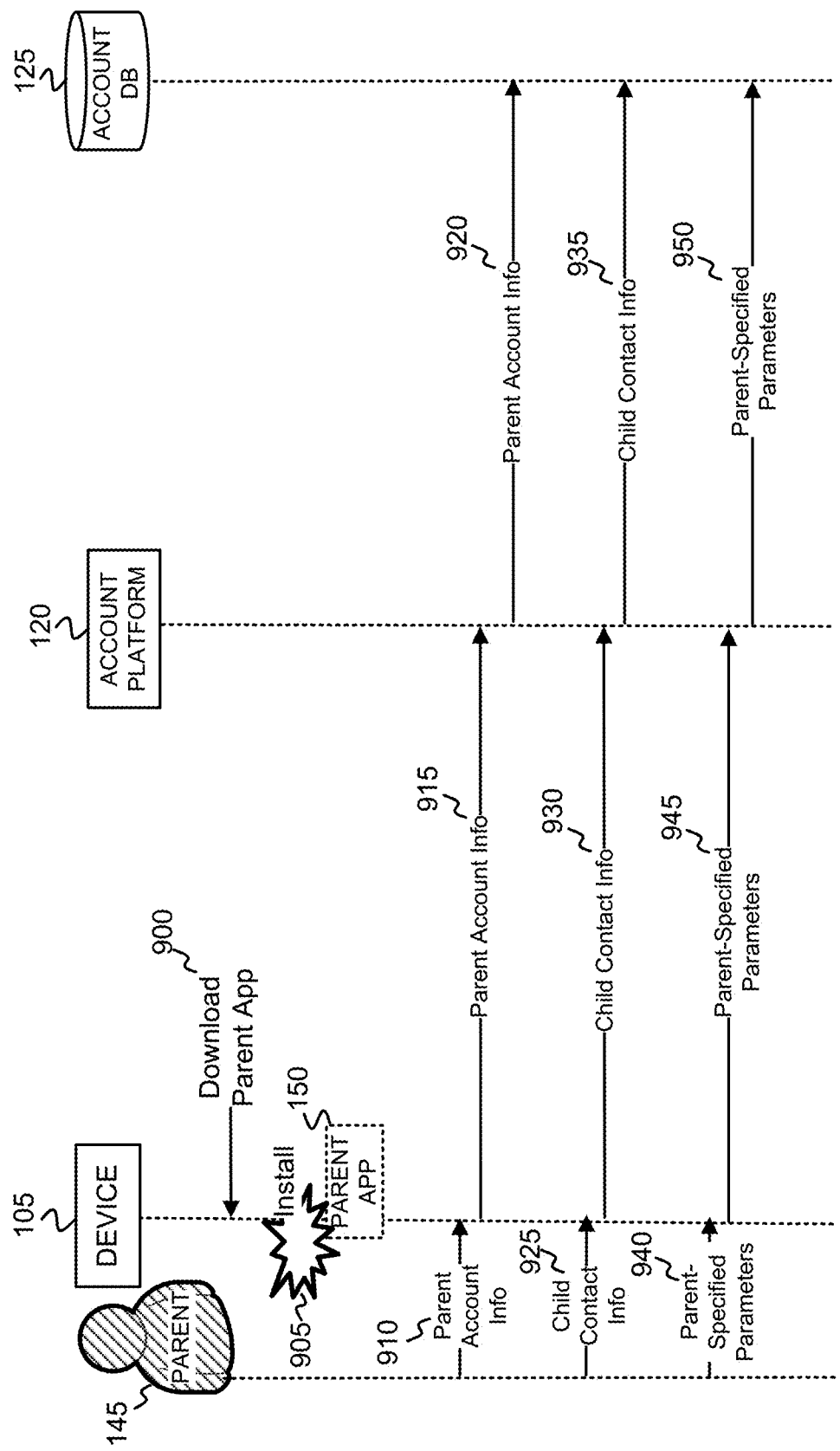
FIG. 9 is an exemplary signaling/operations diagram associated with the process of FIGS. 7A and 7B.

The exemplary process includes parent device 105 downloading a parent app 150 from app server 115 (block 700), and installing and executing the parent app 150 (block 705). Parent device 105, upon initiation by parent 145, may send a download request of the parent app 150 to app server 115 via network(s) 135. Upon receipt of the request, parent device 105 begins uploading the parent app 150 for delivery to parent device 105 via network(s) 135. In the case of both parents of a child managing the parent account jointly, each device 105 operated by each parent separately downloads the parent app 150 from app server 115. Upon completion of the downloading of the parent app 150, parent device 105 may return an acknowledgment message to app server 115. FIG. 9 depicts parent device 105 downloading 900 the parent app 150 from app server 115 (not shown), and installing 905 the parent app 150. Upon successful installation, parent app 150 may execute the parent app 150 for use by parent 145.

Parent device 105 receives account information of parent 145, including a child list (block 710), and sends the parent account information to account platform 120 (block 715). The parent account information may include, for example, the parent 145's name (or parents' name if the parent account is managed jointly by both of the child's parents), contact information, credit card/debit card/bank account information, a list of children for which the parent 145 monitors, manages, and controls their spending accounts, and possibly a list of individuals (e.g., grandparents, aunts, uncles, friends, etc.) that the parent 145 approves for providing monetary gifts to the spending accounts of the children identified in the list of children. FIG. 8A depicts an exemplary user interface 800 of parent app 150 that may be displayed via, for example, a touch screen display of parent device 105. User interface 800 may be used by parent 145 to enter the parent account information for provision to account platform 120. As shown, the user interface 800 may include parent information entry blocks 805 that enable the parent 145 to enter the parent's name, the parent's contact information (e.g., phone number, email address), and the parent's debit card, credit card, or bank account information. User interface 800 may additionally include entry blocks for entering a list of children 810 whose spending accounts the parent 145 will monitor, manage, and control. An additional child (or children) may be added to the child list 810 by selecting the "add child" button 815. User interface 800 further includes entry blocks 820 for entering a list of individuals (gifters) who are approved by the parent 145 for providing monetary gifts to the children in the child list. An additional gifter may be added to the gifter list by selected the "add gifter" button 825. Upon receipt, account platform 120 stores the parent account information in parent account data structure 300 (block 720). FIG. 9 depicts parent 145 entering parent account information 910 into parent app 150, and parent app 150 sending a message 915, that includes the parent account information, to account platform 120. Account platform 120 extracts the parent account information from the received message 915, and stores 920 the parent account information in account DB 125. The parent's name may be stored in parent ID field 310, the parent contact information in field 315, the parent financial information (e.g., credit card/debit card/bank account) in field 320, the list of children in field 325, and the approved list of gifters in field 330 of an entry 305 of parent account data structure 300.

Parent device 105 receives contact information for each child (block 725), and sends the child contact information to account platform 120 (block 730). FIG. 8B depicts an exemplary user interface 830 of parent app 150 that may be displayed via, for example, the touch screen display of parent device 105 to enable parent 145 to enter child contact information for provision to account platform 120. As shown, user interface 830 includes a child contact information block 835 that permits the parent 145 to enter the child's phone number and/or email address for text, audio, or email communication. Upon receipt, account platform 120 stores the child contact information in child data structure 400 (block 735). Account platform 120 may store the child 165's ID in field 410, and the child 165's contact information in field 415 of an entry 405 of child data structure 400. FIG. 9 depicts parent 145 entering child contact information 925 into parent app 150, and parent app 150 sending a message 930, that includes child contact information, to account platform 120. FIG. 9 further depicts account platform 120 storing 935 the child contact information in account DB 125.

Figure 8C:
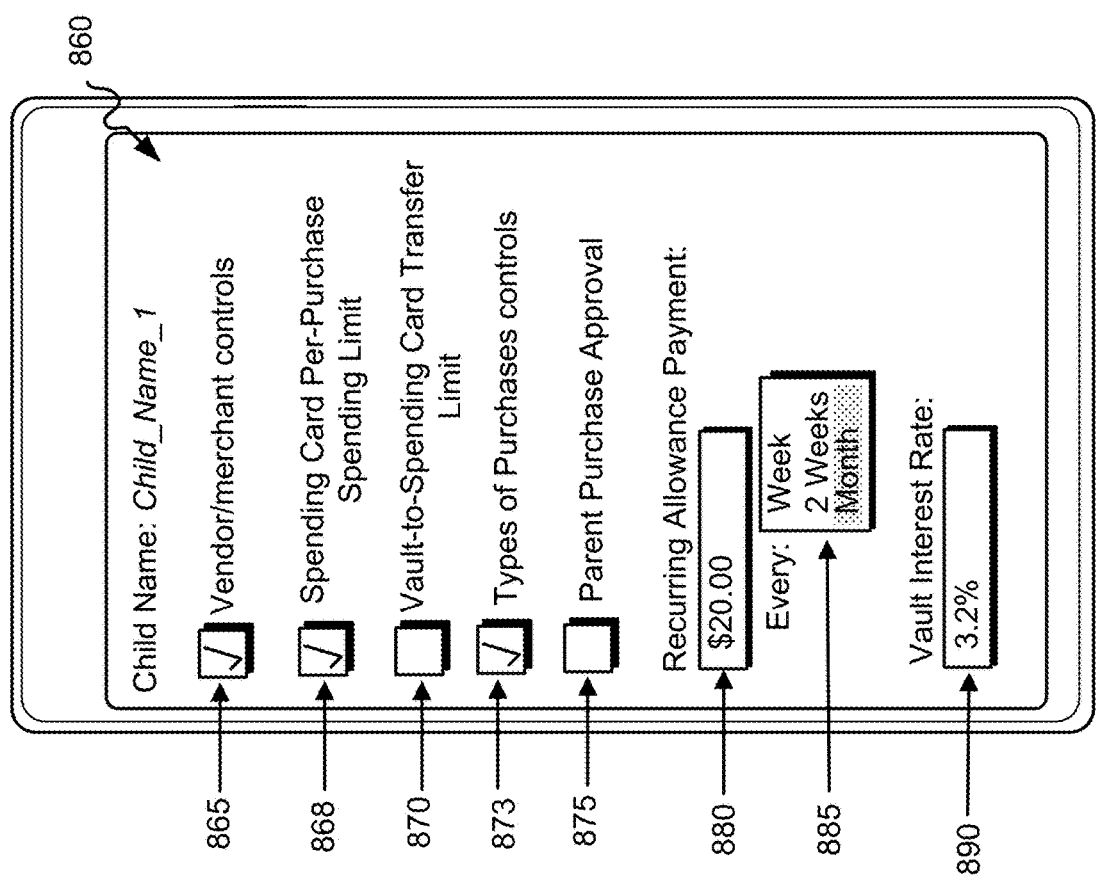

Parent device 105 receives parent-specified parameters for each child's account (block 740), and sends the parent-specified parameters for each child to account platform 120 (block 745). The parent 145 may specify various parameters for each child's spending account including, for example, an amount of money allocated to the child's "vault" and an amount of money allocated to the child's spending card 175. The various parameters for each child's spending account may additionally include vendor/merchant controls applied to purchases by the child using the child's spending card associated with the child's spending account, per-purchase spending limits, vault-to-spending card transfer limits, types of purchases controls, parent purchase approval, recurring allowance payments, and/or a vault interest rate. FIG. 8B depicts user interface 830 including a vault block 840 for entering an amount of money allocated to the child's vault, and a spending card block 845 for entering an amount of money allocated to the child's spending card 175. FIG. 8C depicts an exemplary user interface 860 of parent app 150 that may be displayed via, for example, the touch screen display of parent device 105 to enable parent 145 to enter additional parameters associated with each child's spending account. User interface 860 includes a vendor/merchant controls checkbox 865, a spending card per-purchase spending limit checkbox 868, a vault-to-spending card transfer limit checkbox 870, a types of purchases controls checkbox 873, a parent purchase approval checkbox 875, a recurring allowance payment entry section 880, a period/frequency field 885 associated with section 880, and a vault interest rate entry block 890.

Vendor/merchant controls checkbox 865, when selected (i.e., checked) by parent 145, applies vendor or merchant controls to purchases made by the child 165 using the child's spending card 175. The vendor or merchant controls may, for example, prohibit purchases from certain vendors or merchants, or from certain types of vendors or merchants, may set dollar limits on purchases made from certain vendors or merchants, or may require parent approval for purchases attempted to be made from certain vendors or merchants. Other types of merchant controls may be included in the vendor/merchant controls supplied by the parent 145.

Per-purchase spending limit checkbox 868, when selected (i.e., checked) by parent 145, applies per-purchase spending limits to purchases made using, for example, the child 165's spending card 175. For example, the parent 145 may specify a $100 per-purchase spending limit on purchases by the child 165 using the spending card 175.

Vault-to-spending card transfer limit checkbox 870, when selected (i.e., checked) by parent 145, applies limits on an amount of money that can be transferred from the child 165's vault to the child's spending card 175. For example, the parent may specify a $200 per day maximum for transferring money from the child's vault to the child's spending card.

Types of purchases controls checkbox 873, when selected (i.e., checked) by parent 145, limits or restricts the types of purchases that the child 165 may make using the child 165's spending card 175. For example, the parent 145 may specific that the child cannot buy candy, or may only spend a maximum amount of money per month on clothes. The types of purchases controls may, in some implementations, only apply to categories of purchases, such as the child 165 may only use the spending card to purchase school supplies, or may not use the spending card to purchase on-line games.

Parent purchase approval checkbox 875, when selected (i.e., checked) by parent 145, indicates that the parent 145 must approve each purchase made by the child 165 using the child's spending account, including money in the child's vault, wallet, or spending card.

Recurring allowance payment entry section 880 includes an entry block 880, and a frequency selection block 885, that permits the parent 145 to specify an amount of money to be transferred to the child 165's spending account (e.g., the child 165's vault) at a frequency selected in the frequency selection block 885 (e.g., every week, every 2 weeks, every month).

Vault interest rate entry block 890 permits the parent 145 to specify an amount of interest to be applied to money saved within the child 165's vault over a certain period of time.

FIG. 9 depicts parent 145 entering parent-specified parameters 940 into parent app 150, and parent app 150 sending a message 945, that includes parameters, to account platform 120. FIG. 9 further depicts account platform 120 storing 950 the received parent-specified parameters in account DB 125. Account platform 120 stores the parent-specified parameters for each child in child data structure 400 (block 750). Account platform 120 stores the parent-specified parameters in field 440 of child data structure 400 in an entry 405 corresponding to the child 165.

Parent device 105 sends a message to each child with a link to app server 115 for downloading a child app 170 (block 755). In one implementation, parent app 150 sends a text message to each child included in the child list, where the text includes a link (e.g., hypertext link) to download the child app 170 from app server 115. In another implementation, parent app 150 sends an instant message to each child included in the child list, where the instant message includes the link to download the child app 170 from app server 115. The separate signaling messages 915, 930, and 945, and 920, 935, and 950, shown in FIG. 9, may be combined as a single message, or as multiple combined messages. For example, messages 915, 930, and 945, shown as separate signaling messages in FIG. 9, may be combined as a single message sent from parent device 105 to account platform 120, with the data described above with respect to messages 915, 930 and 945 being combined into the single message. As another example, messages 920, 935, and 950, shown as separate signaling messages in FIG. 9, may be combined as a single message sent from account platform 120 to account DB 125, with the data described above with respect to messages 920, 935, and 950 being combined into the single message.

Figure 10:
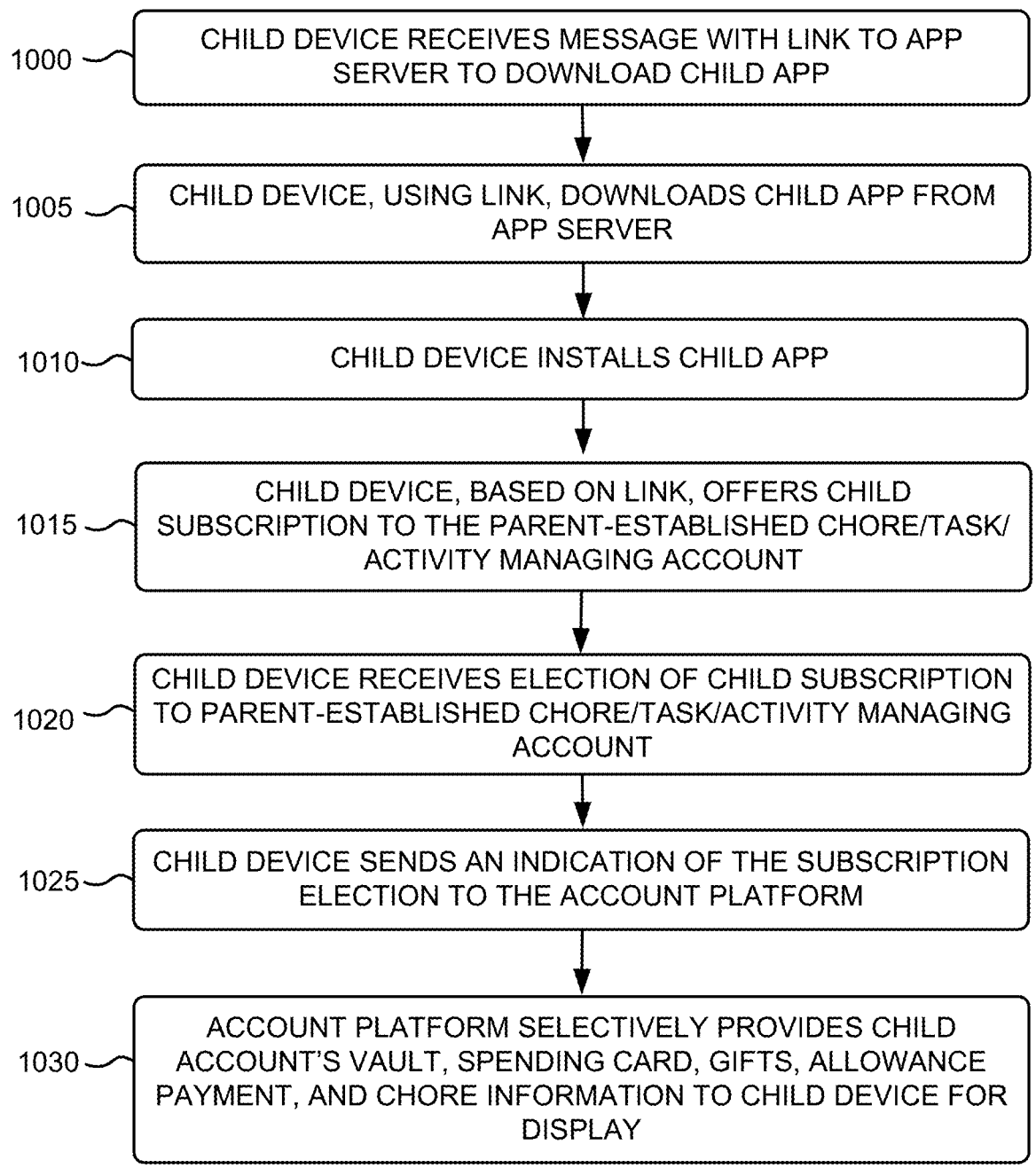
FIG. 10 is a flow diagram of an exemplary process for a child to use a child device to elect a subscription to a parent-established chore/task/activity managing account.

FIG. 10 is a flow diagram of an exemplary process for a child 165 to use a child device 110 to elect a subscription to, or enroll with, a parent-established chore/task/activity managing account. In one implementation, the exemplary process of FIG. 10 may be executed by child device 110, in conjunction with account platform 120 and account DB 125. The exemplary process of FIG. 10 is described below with reference to the user interface diagram of FIG. 11 and the signaling/operations diagram of FIG. 12.

Figure 12:
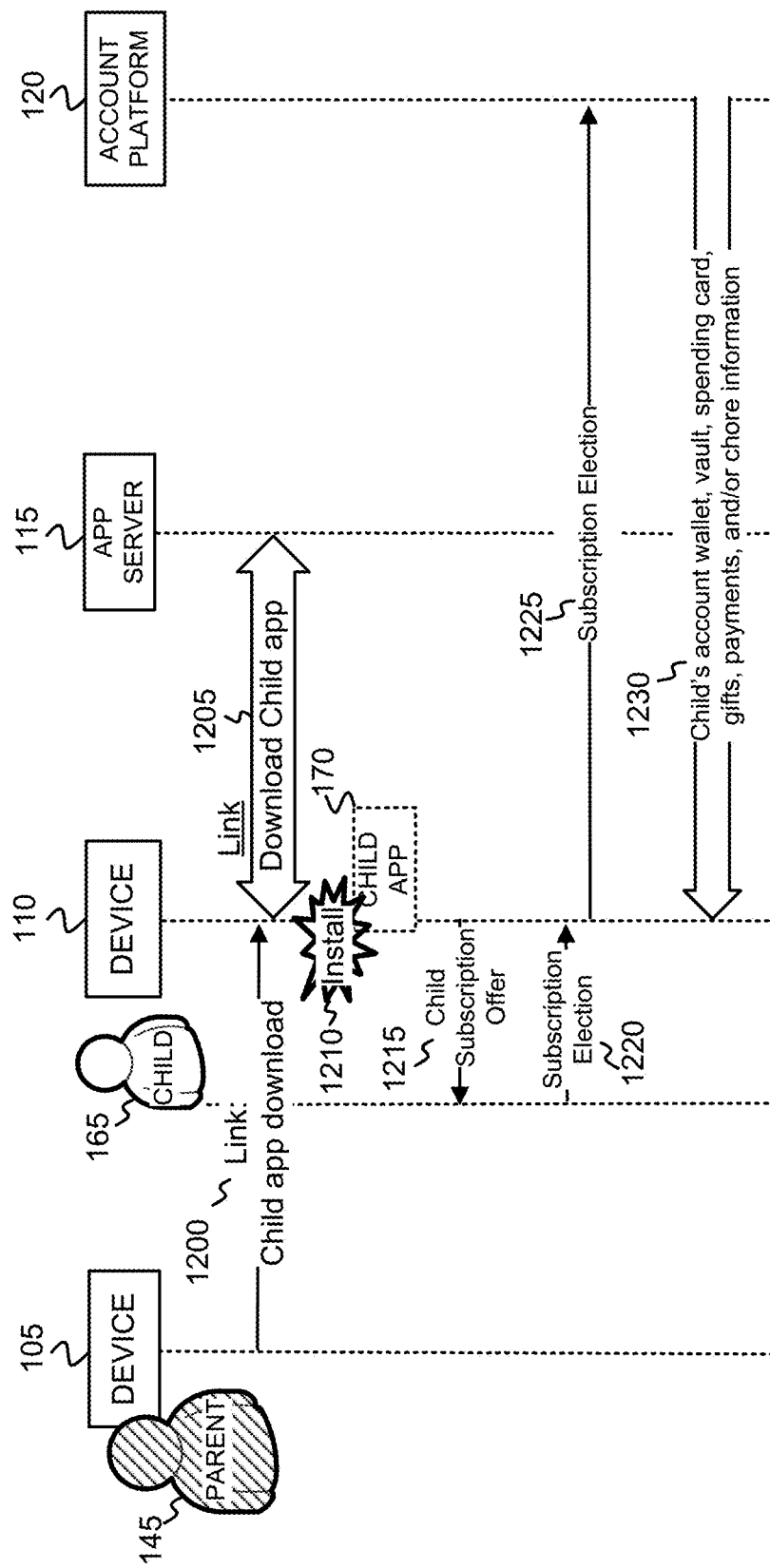
FIG. 12 is an exemplary signaling/operations diagram associated with the process of FIG. 10.

The exemplary process includes child device 110 receiving a message with a link to app server 115 for downloading a child app 170 (block 1000). The link may include, for example, a hypertext link that, when selected, causes child app 170 to begin downloading the child app 170 from app server 115. FIG. 12 depicts child device 110 receiving a message 1200, containing a link to download the child app, from parent device 105.

Child device 110, using the link, downloads the child app 170 from app server 115 (block 1005), and installs the child app 170 (block 1010). App server 115 uploads the child app 170 and delivers the child app 170 via network(s) 135. FIG. 12 depicts child device 110 downloading 1205, using the link contained in the received message, child app 165 from app server 115. Upon completion of the download, child device 110 may install 1210 child app 165, and execute child app 165 upon completion of the installation.

Figure 11:
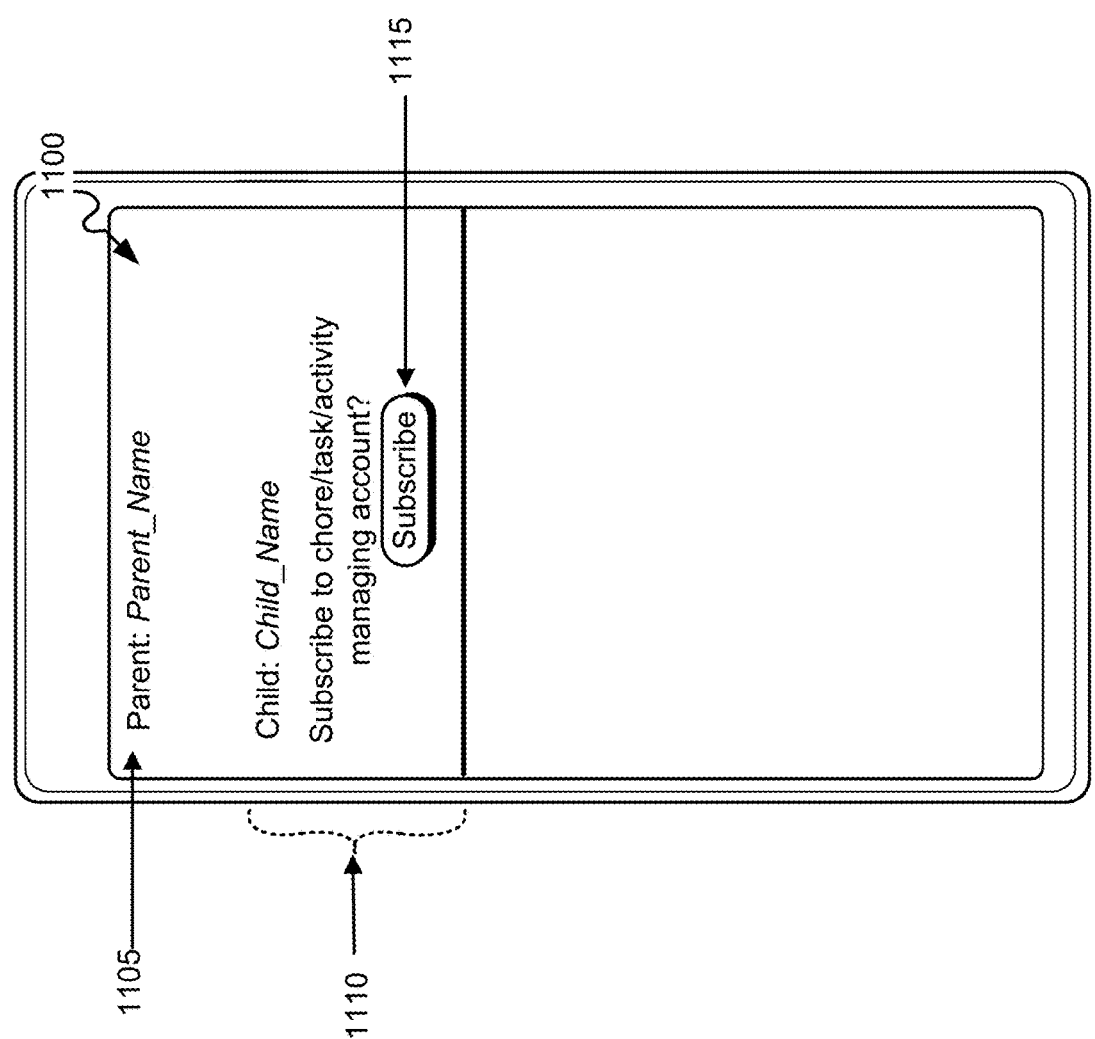
FIG. 11 is a diagram of an exemplary device user interface associated with the process of FIG. 10.

Child device 110, based on the link, offers a child subscription to the parent-established chore/task/activity managing account (block 1015). FIG. 11 depicts an exemplary user interface display 1100 displayed at child device 110 for providing an option for the child 165 to elect to subscribe to the chore/task/activity managing account established by the parent 145. As shown, the user interface display 1100 may identify the parent 1105, may identify the child 1110, and include a subscription/enrollment button 1115 that the child 165 may select (e.g., push with a finger upon the touch screen display) to enroll/subscribe in the parent-established chore/task/activity managing account. FIG. 12 depicts child app 170 presenting a subscription offer 1215 to child 165 via a user interface (not shown) of child device 110.

Child device 110 receives an election of the child subscription to the parent-established chore/task/activity managing account (block 1020), and sends an indication of the subscription election to the account platform 120 (block 1025). FIG. 12 depicts child app 170 receiving a subscription election 1220 from child 165 via a user interface (not shown) of child device 110, and child app 170 sending a message 1225 that includes the child 165's election to a subscription to the spending account created by the parent 145.

Upon receipt of the child's subscription, account platform 120 selectively provides the child account's vault, spending card, gifts, allowance payment, and/or chore information to the child device 110 for display (block 1030). Account platform 120 identifies an entry 405 in child data structure 400 having a child ID in field 410 that matches the identified of the child 165, and retrieves the amount of money in the child 165's vault from field 425, and the amount of money allocated to the child 165's spending card from field 430. Account platform 120 further retrieves the pointer from chore list field 435, that points to a chore list data structure 500, and retrieves the chores assigned to the child 165 by the parent 145 from fields 510 of one or more entries 505 of chore list data structure 500. FIG. 12 depicts account platform 120 sending 1230 the child 165's account vault, spending card, gifts, payments, and/or chore information to child app 170 at child device 110.

Figure 13:
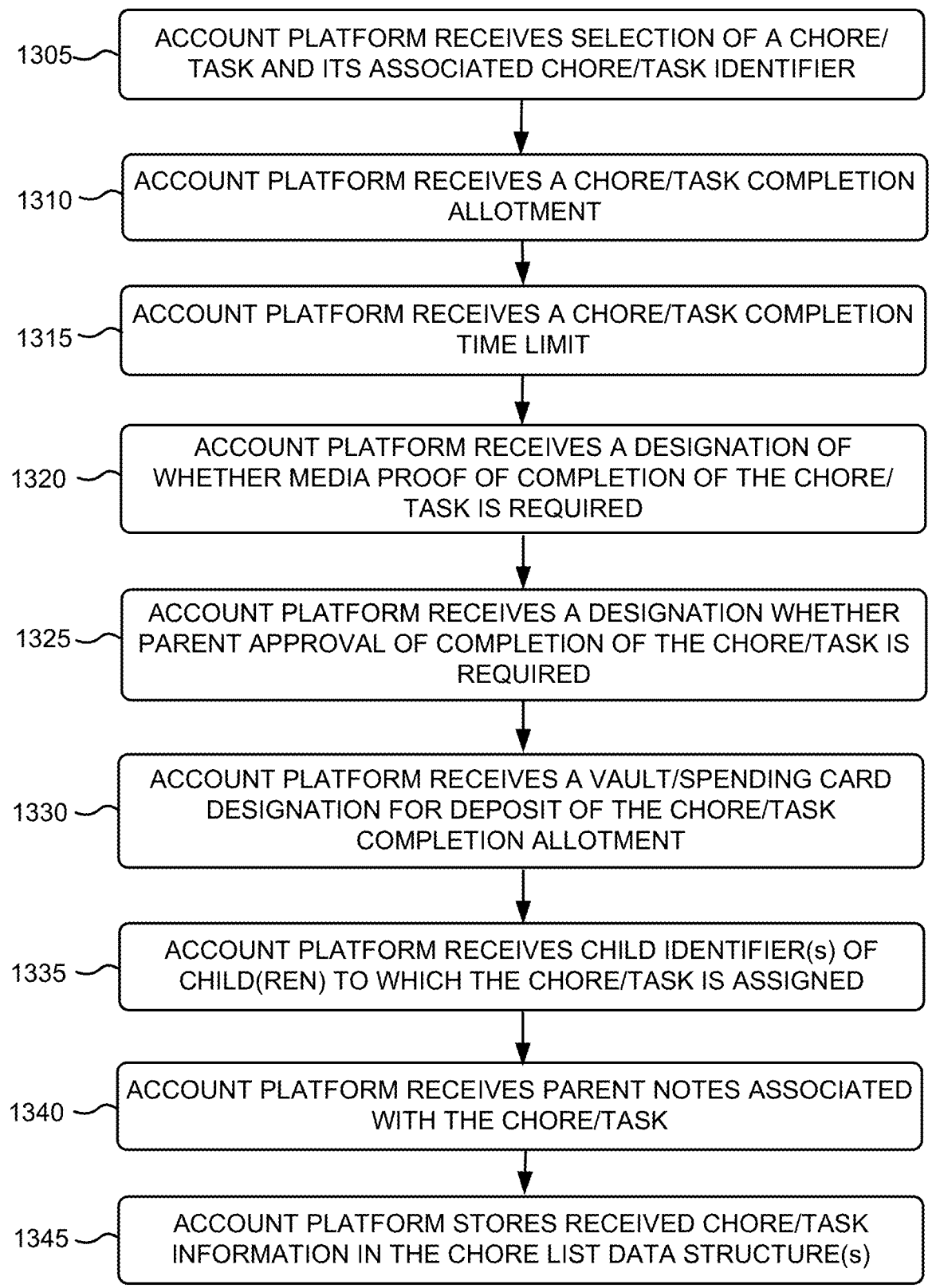
FIG. 13 is a flow diagram of an exemplary process for a parent to assign one or more selected chores/tasks to a child, and supply the selected chore/task to account platform for storage in association with the child's chore/task/activity managing account.

FIG. 13 is a flow diagram of an exemplary process for a parent 145 to assign one or more selected chores/tasks to a child 165, and to supply the selected chore/task, and associated parameters, to account platform 120 for storage in association with the child 165's chore/task/activity managing account. In one implementation, the exemplary process of FIG. 13 may be executed by account platform 120, in conjunction with parent device 105 and account DB 125. The exemplary process of FIG. 13 is described below with reference to the user interface diagrams of FIGS. 14A-14D and the signaling/operations diagram of FIG. 15.

Figure 14B:
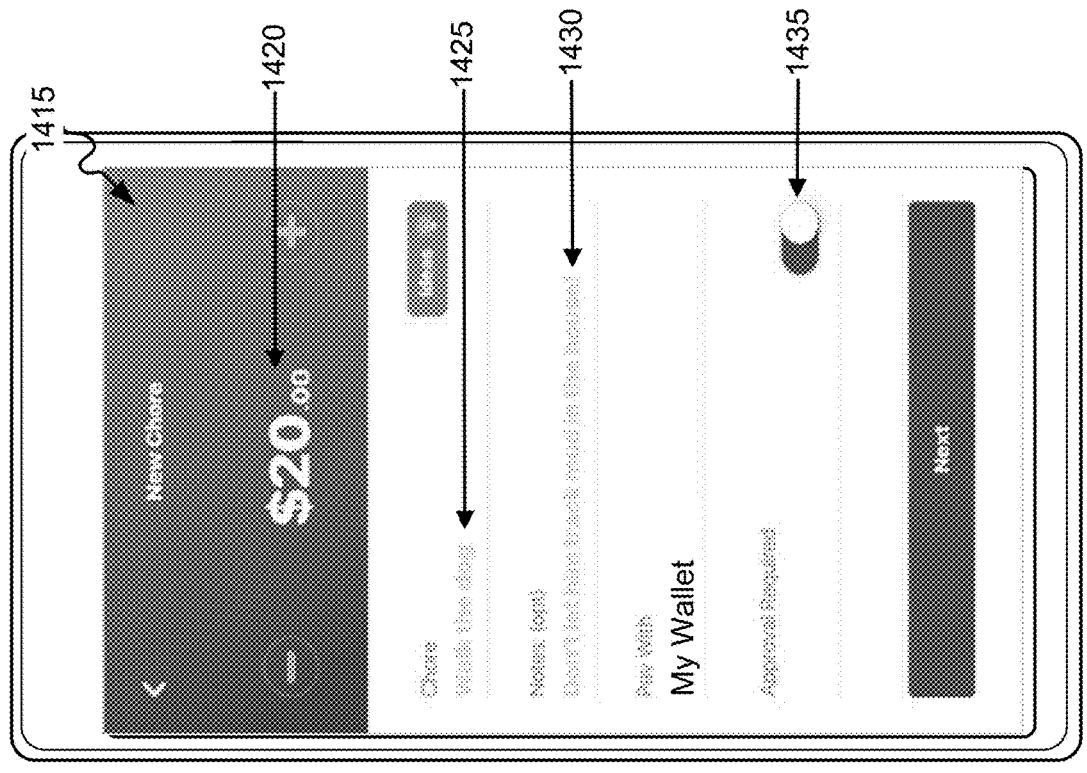
FIGS. 14A, 14B, 14C, and 14D are diagrams of exemplary device user interfaces associated with the process of FIG. 13.
Figure 14A:
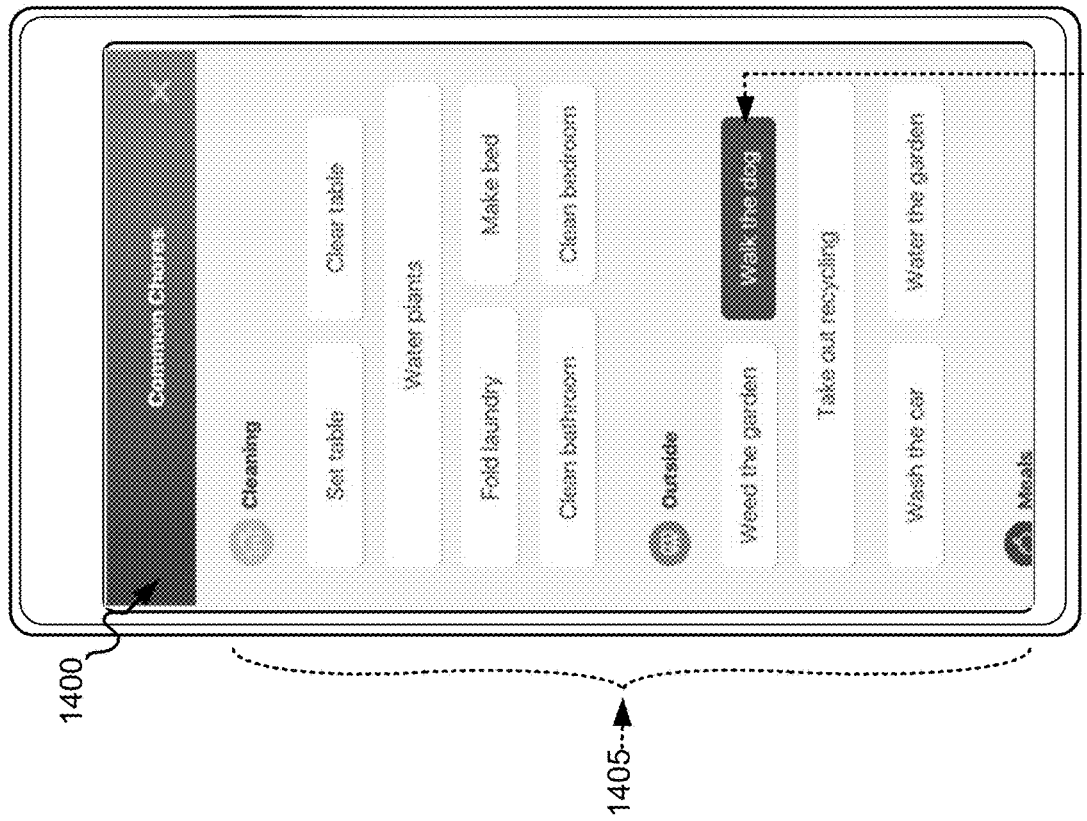
Figure 14D:
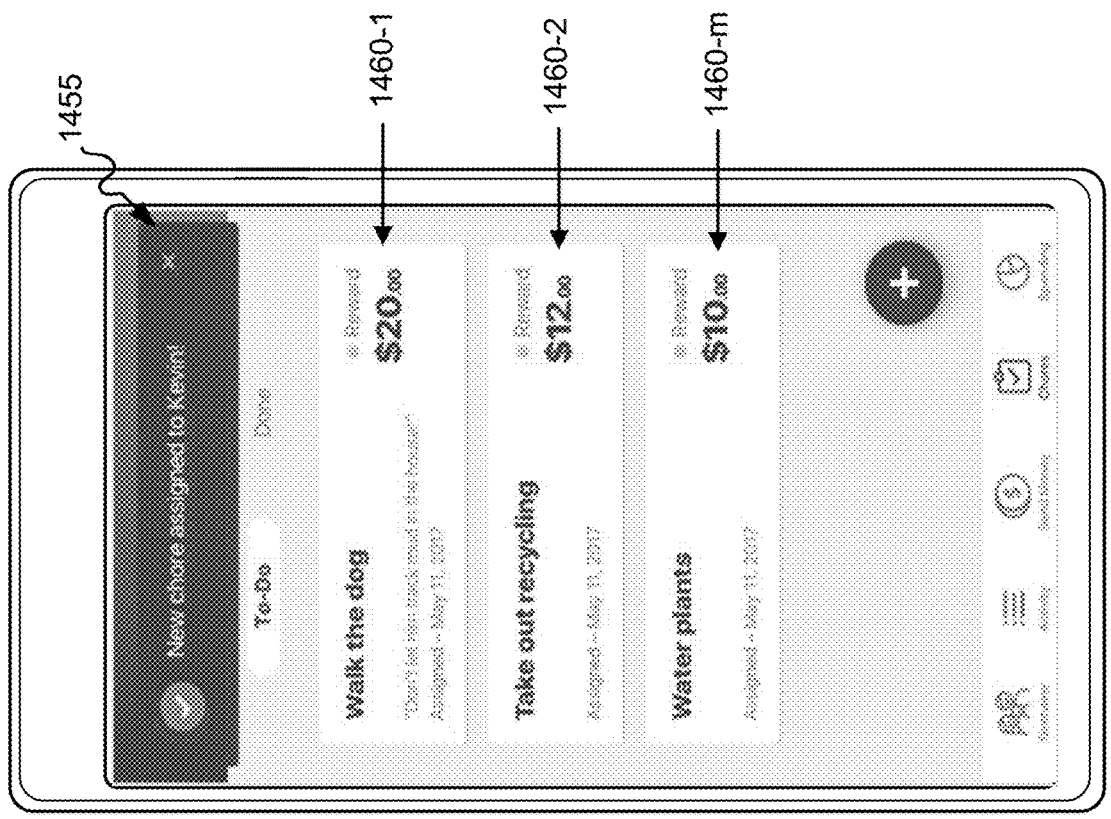
Figure 14C:
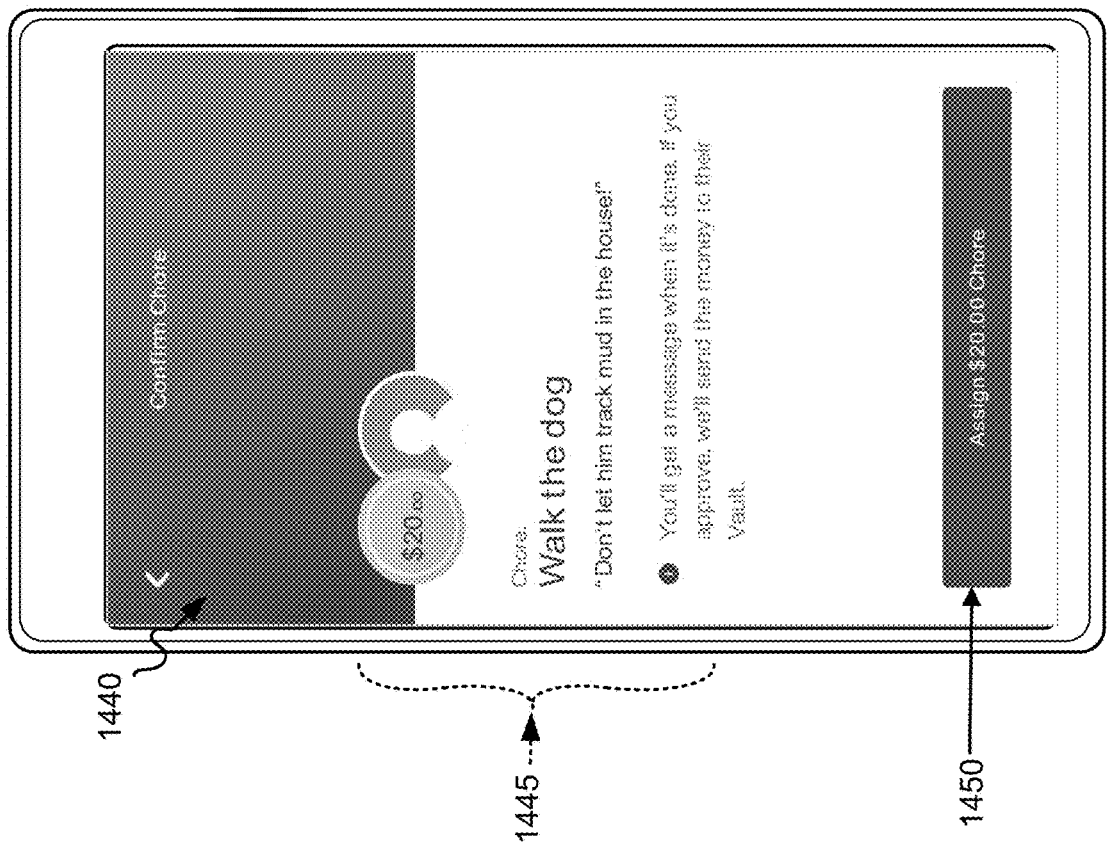

The exemplary process includes account platform 120 receiving a selection of a chore/task and its associate chore/task identifier (block 1305), receiving a chore/task completion allotment (block 1310), and receiving a chore/task completion time limit (block 1315). FIG. 14A shows an exemplary user interface 1400, displayed via touch screen display by parent app 150, that presents various different chores/tasks 1405 that may be selected by parent 145 for assignment to a child 165. The parent 145, via interaction with the touch screen display, may select 1410 (shown as highlighted) a particular chore/task for assignment to a child 165. The user interface 1400 may additionally permit the parent 145 to enter a custom chore/task (not shown) for assignment to the child 165. FIG. 14B further shows another exemplary user interface 1415 that permits the parent 145 to enter a chore/task completion allotment 1420 for the chore/task 1425 selected using user interface 1400. In the example in FIG. 14B, the chore/task completion allotment includes an amount of money (e.g., in U.S. dollars). In other examples, the chore/task completion allotment may include an amount of cryptocurrency, a particular award or prize, virtual applause or acclamation (e.g., an automatic post to social media, such as Facebook, notifying friends and/or family of the child's completion of the chore/task), a parent-designated privilege (e.g., use of the family car on a Friday night), or another type of allotment not described here. The chore/task completion time limit (not shown in FIGS. 14A or 14B) provided by parent 145 may include a period of time during which the child 165 may perform the selected chore/task and still receive the selected completion allotment. For example, the completion time limit may be a date and/or time at which the selected chore expires, and prior to which the child 165 must complete the selected chore/task. FIG. 15 depicts parent 145 providing parent input 1500, via a user interface (not shown), to parent app 150. The parent input 1500 includes a selected chore/task ID, a chore/task completion allotment, and a chore/task completion time limit. Parent app 150, as shown in FIG. 15, sends a chore/task ID 1505, a chore/task completion allotment 1510, and a chore/task completion time limit 1515 to account platform 120.

Account platform 120 receives a designation of whether media proof of chore completion is required (block 1320), and receives a designation of whether parent approval of chore/task completion is required (block 1325). The designation may include the parent 145 providing an indication (Y/N) of whether proof, in the form of some type of digital media (e.g., an audio file, one or more image files, or a video file), is required before the completion award amount may be awarded to the child 165. The media may be generated manually or automatically at child device 110 using, for example, a microphone and/or a camera of child device 110. Other data at child device 110 may also be used as evidence of chore/task completion, including geolocation data (e.g., Global Positioning System (GPS) data), obtained at child device 110. In some implementations, child app 170, parent app 150, and/or account platform 120 may automatically determine whether the evidence of completion of a chore/task is adequate, as described in more detail below. As shown in FIG. 14B, the user interface 1415 may include a selection button 1435 that enables the parent 145 to designate (Y/N) whether the parent 145 must approve completion of the chore prior to the completion award amount being awarded to the child 165.

Referring to FIG. 15, the parent input 1500 provided by parent 145 to parent app 150 includes a selection/designation (Y/N) of whether parent 145 requires media proof of completion of the chore/task, and further includes a selection/designation (Y/N) of whether parent 145 must approve any supposedly completed chore/task. Parent app 150, as shown in FIG. 15, sends the selection/designation 1520 of the completion proof requirement, and the selection/designation 1525 of completion approval to account platform 120.

Account platform 120 receives a vault/spending card designation for deposit of the chore/task completion award (block 1330), and receives a child ID(s) of the child(ren) to which the chore/task is assigned (block 1335). The parent 145 may designate, via the user interface generated by parent app 150, whether the completion allotment awarded to the child 165 for completing the assigned chore/task, when the allotment includes an amount of money, is to be allocated/transferred to the child 165's vault, or spending card associated with the child 165's spending account. Referring to FIG. 15, the parent input 1500 provided by parent 145 to parent app 150 includes a vault/spending card designation, and one or more child IDs associated with each of the one or more children assigned to the particular chore/task. Parent app 150, as shown in FIG. 15, sends the vault/spending card designation 1530, and the child ID(s) 1535, to account platform 120.

Account platform 120 receives parent notes associated with the chore/task selected in block 1305 (block 1340). The user interface 1415 of FIG. 14B includes a parent notes entry field 1430 that enables the parent 145 to enter specific notes related to the child 165's completion of the chore/task. Referring again to FIG. 15, the parent input 1500 provided by parent 145 to parent app 150 includes the parent notes related to the selected chore/task. The parent notes may include, for example, reminders or instructions from the parent to the child 165 regarding certain aspects of the selected chore/task (e.g., remember to put the lid back on the garbage can). Parent app 150, as shown in FIG. 15, sends the parent notes 1540 to account platform 120.

Account platform 120 stores the received chore/task information in the chore list data structure(s) 500 in account DB 125 (block 1345). Account platform 120 stores the child identifier(s) received in block 1335 in chore ID field 510, the chore completion allotment received in block 1310 in field 515, the completion time limit received in block 1315 in field 525, the proof of completion designation received in block 1320 in field 530, the parent approval designation received in block 1325 in field 520, the vault/spending card designation received in block 1330 in field 540, and the parent notes received in block 1340 in field 545 of an entry 505 of chore list data structure 500 in account DB 125. FIG. 15 depicts account platform 120 storing 1545 the received chore/task information, including the chore/task ID 1505, the chore/task completion allotment 1510, the chore/task completion time limit 1515, the designation 1520 of a requirement of completion proof, the designation 1525 of a requirement of parent approval, the vault/spending account designation 1530, the child ID(s) 1535, and the parent notes 1540, in account DB 125. The separate signaling messages 1505, 1510, 1515, 1520, 1525, 1530, 1535, and 1540, shown in FIG. 15, may be combined as a single message, or into multiple combined messages. For example, messages 1505, 1510, 1515, 1520, 1525, 1530, 1535, and 1540, shown as separate signaling messages in FIG. 15, may be combined as a single message sent from parent device 105 to account platform 120, with the data described above with respect to messages 1505, 1510, 1515, 1520, 1525, 1530, 1535, and 1540 being combined into the single message.

Figure 16A:
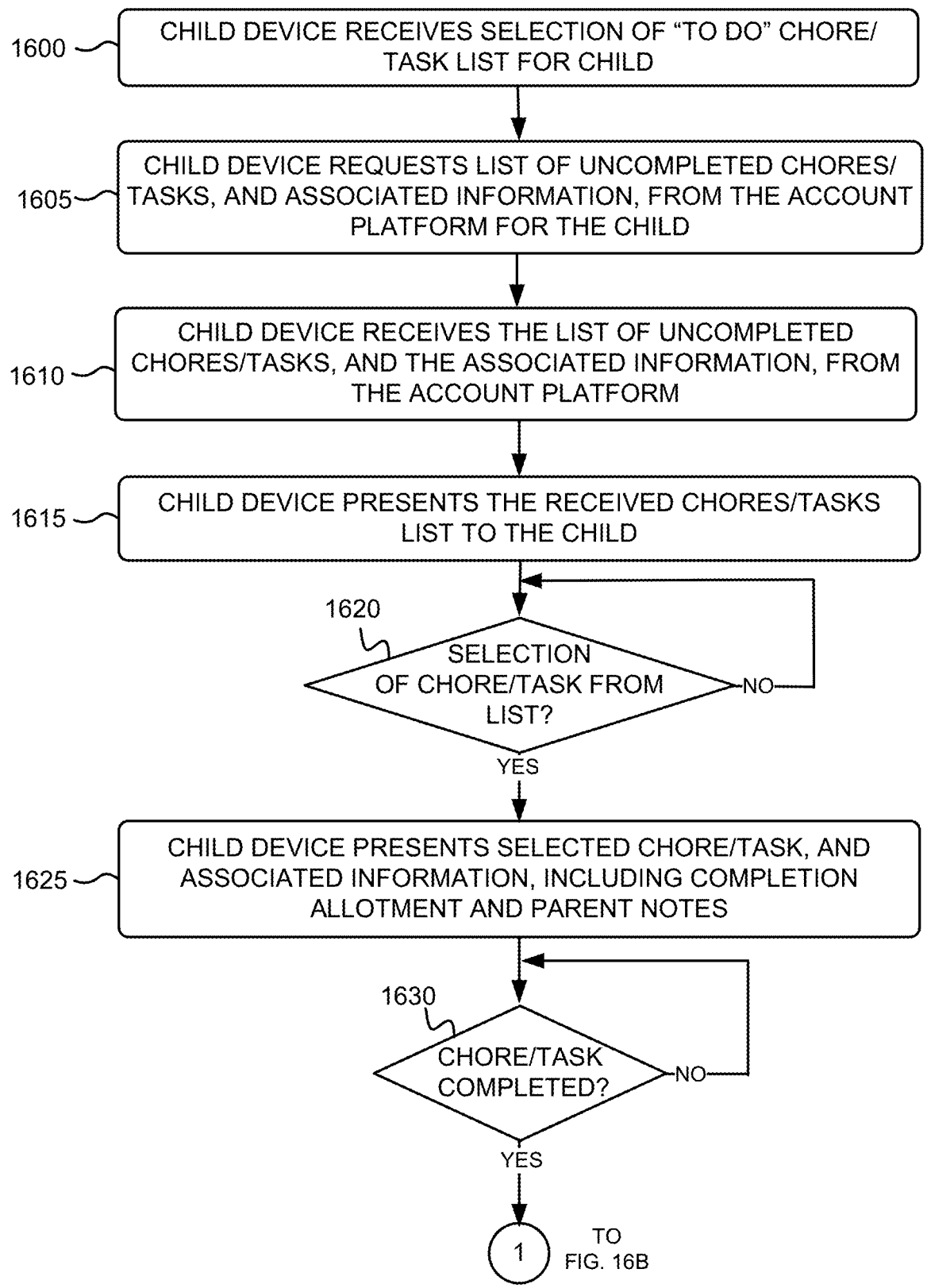
FIGS. 16A and 16B are flow diagrams of an exemplary process for a child to use a child device to access uncompleted chore/tasks assigned by a parent and perform the chores/tasks for receipt of an allotment(s) associated with completion of the chores/tasks.
Figure 16B:
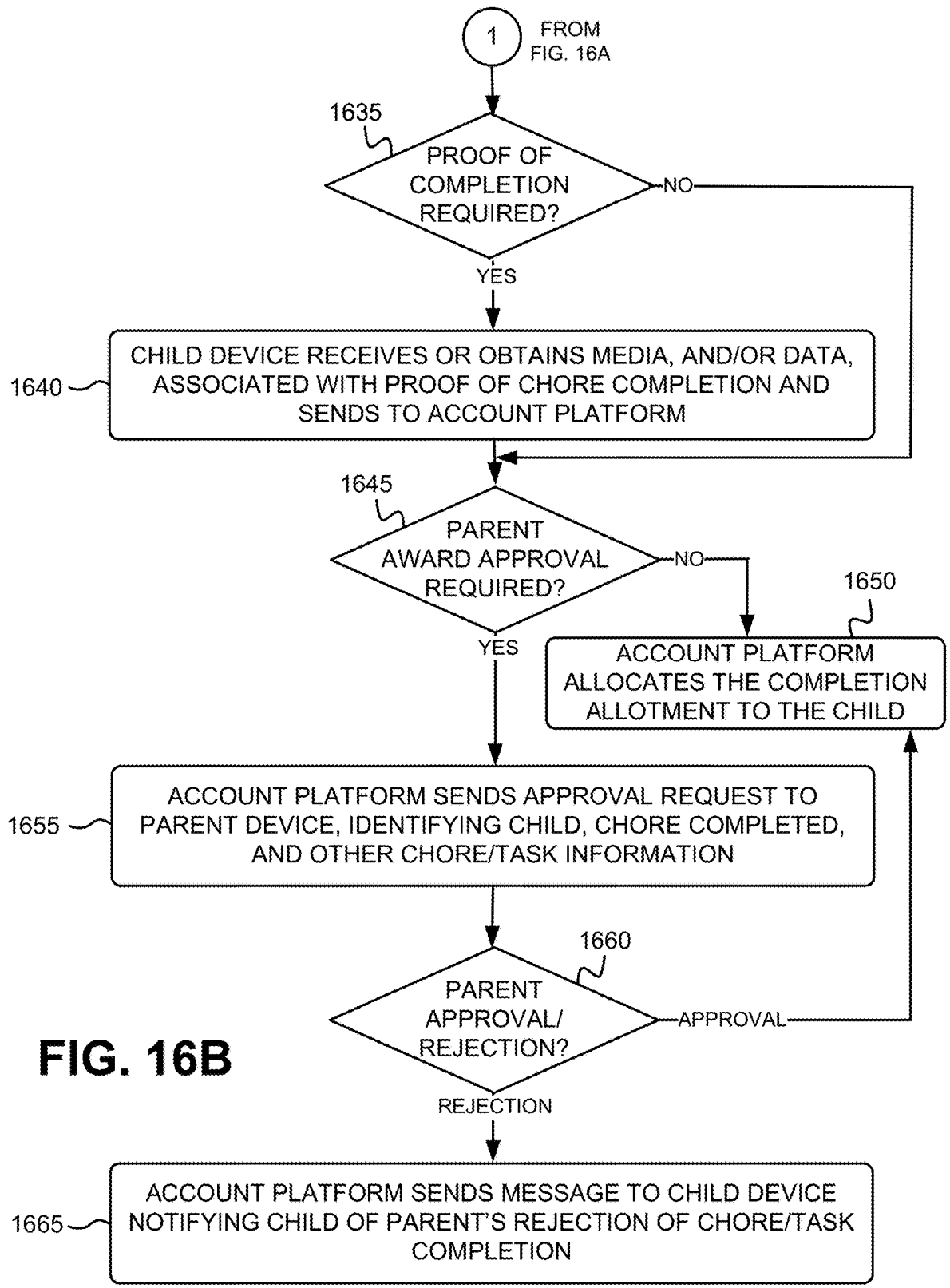

FIGS. 16A and 16B are flow diagrams of an exemplary process for a child 165, using a child device 110, to access uncompleted chore/tasks assigned by parent 145 and to perform the chores/tasks for receipt of an allotment(s) associated with completion of the chores/tasks. In one implementation, the exemplary process of FIGS. 16A and 16B may be executed by child device 110, in conjunction with account platform 120 and parent device 105. The exemplary process of FIGS. 16A and 16B is described below with reference to the signaling/operations diagram of FIG. 17 and the user interface diagrams of FIGS. 18A-18H.

The exemplary process includes child device 110 receiving a selection of a "to do" chore/task list for the child 165 (block 1600), requesting a list of uncompleted chores/tasks, and associated information, from the account platform 120 for the child 165 (block 1605), receiving the list of uncompleted chores/tasks, and the associated information, from the account platform 120 (block 1610), and presenting the received chores/tasks list to the child 165 (block 1615).

As shown in the user interface 1800 of FIG. 18A, child app 170 at child device 110 may receive a notification 1805 of a new chore/task assigned to child 165 and, upon selection of the new notification 1805 (e.g., by touching the notification 1805 in the touch screen display), or selecting a "to do" button 1817 within a "Jobs" user interface display 1815, a list of chores/tasks 1820-1 through 1820-$q$ (where q is greater than or equal to 1) assigned to the child 165 may be displayed via, for example, a touch screen display of child device 110.

Figure 17:
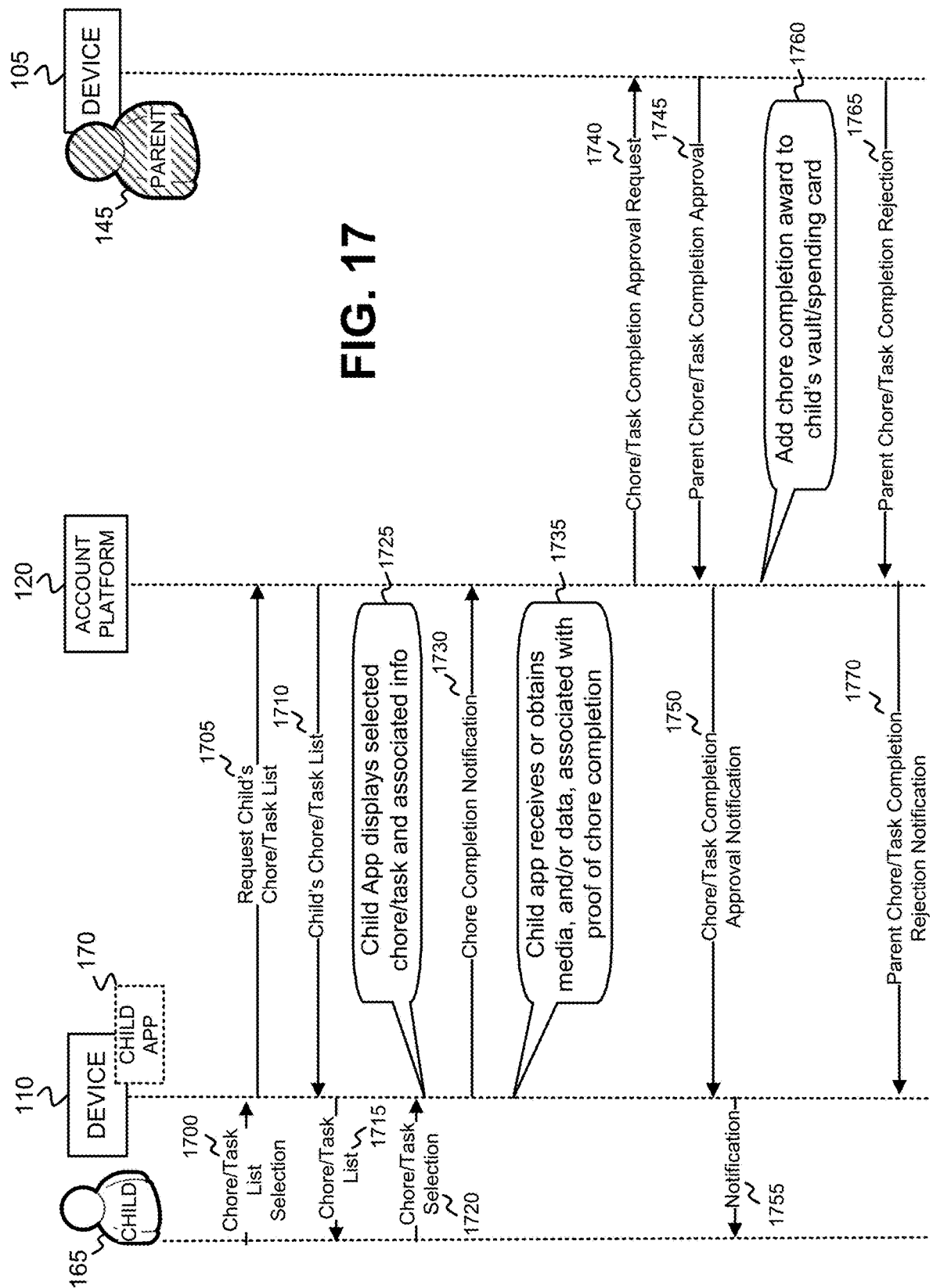
FIG. 17 is an exemplary signaling/operations diagram associated with the process of FIGS. 16A and 16B.

FIG. 17 depicts child 165 selecting 1700, via a user interface (not shown) generated by child app 170 at child device 110, a chore/task list assigned by a parent 145 to the child 165. FIG. 17 further depicts child app 170 sending a request 1705 for the chore/task list to account platform 120, account platform 120 returning the requested chore/task list 1710 to child app 170 at child device 110, and child device 110 displaying, via the user interface (not shown), the uncompleted chore/task list 1715 to child 165.

Child device 110 determines if child 165 has entered a selection of a chore/task from the displayed list (block 1620). Referring to the "Jobs" user interface display 1815 of FIG. 18B, the child 165 may select a chore/task from the list of chores/tasks 1820-1 through 1820-$q$ by touching the displayed chore/task upon the touch screen display, such as, for example, touching the "Walk the dog" chore/task 1820-1. FIG. 17 depicts child 165 entering a chore/task selection 1720 via the user interface (not shown) generated by child app 170.

Figure 18D:
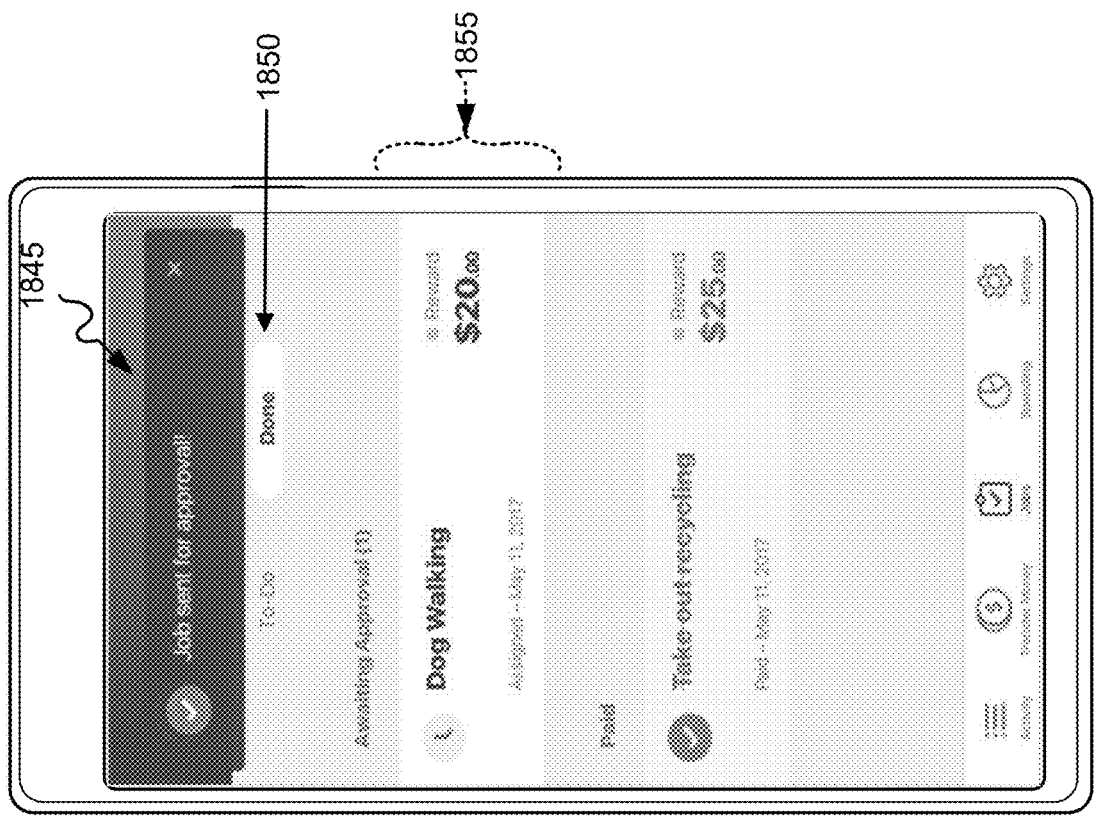
Figure 18C:
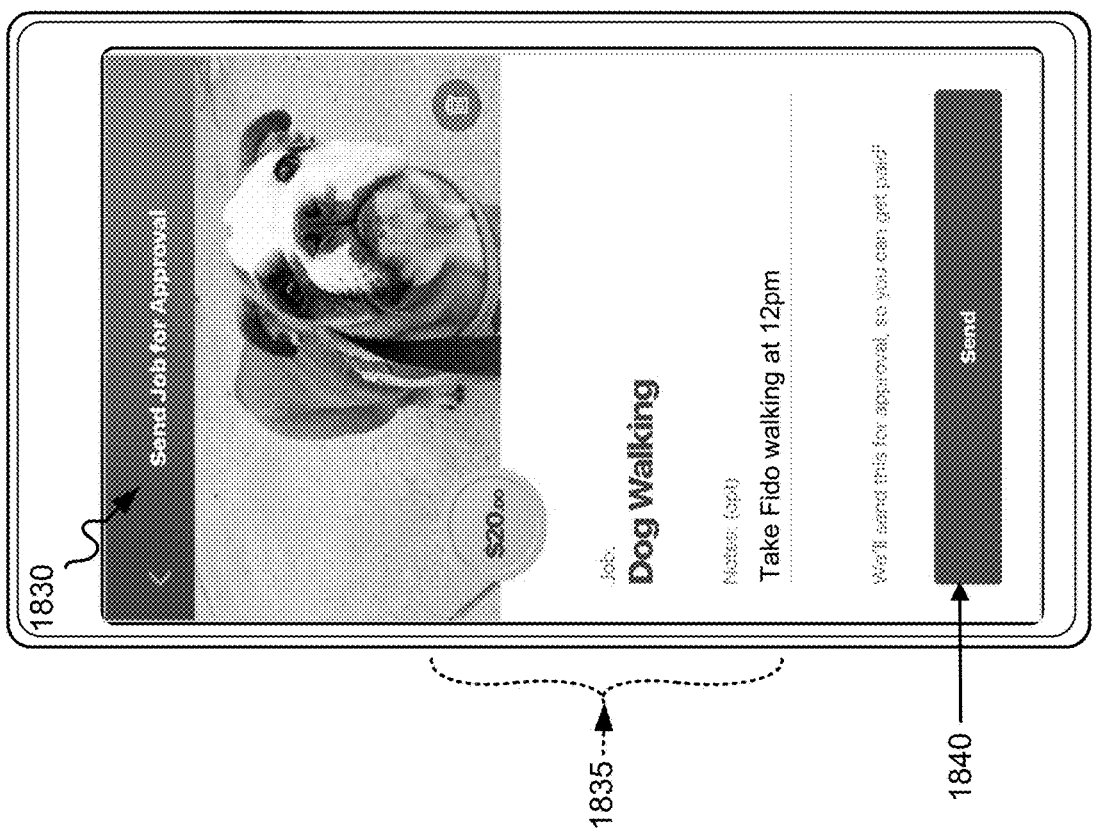

When child 165 enters the selection of the chore/task from the list (YES—block 1620), then child device 110 presents the selected chore/task, and associated information, including a completion allotment and parent notes (block 1625). FIG. 18C depicts an exemplary user interface display 1830 that displays the chore/task 1835, and associated information, such that child 165 can choose to perform the chore/task 1835. In the example shown in FIG. 18C, the chore/task is "Dog Walking," the parent notes indicate "Take Fido walking at 12 pm," and the monetary completion allotment is $20.00. FIG. 17 depicts child app 170 at child device 110 displaying 1725 the selected chore/task and its associated information.

Child device 110 determines if the chore/task has been completed by the child 165 (block 1630). In one implementation, child 165, via the user interface of child device 110, may provide input indicating that child 165 has completed the chore/task. Referring to the user interface display 1830 of FIG. 18C, the child 165 may select the "send" button 1840 once the assigned chore/task has been completed to cause completion notification signaling to be sent by child app 170 to account platform 120. FIG. 17 depicts child app 170 sending a chore completion notification 1730 to account platform 120.

If child device 110 determines that the chore/task has been completed (YES—block 1630), then child device 110 determines if proof of completion is required (block 1635). Proof of completion may require the child device 110 to obtain media evidence (e.g., audio, one or more images, and/or video) of completion of the chore/task that can be presented to the parent 145. If no proof of completion is required (NO—block 1635), then the process continues at block 1645. If proof of completion is required (YES—block 1635), then child device 110 receives or obtains media, and/or data, associated with proof of chore completion and sends the media/data to account platform 120 (block 1640). Child app 170 at child device 110 may record audio, and/or generate one or more images or a video, associated with the child 165's completion of the chore/task. In one implementation, the parent 145 may evaluate the media files the determine whether the media files provide sufficient evidence that the child 165 performed and completed the assigned chore/task. In another implementation, child app 170, or account platform 120, may automatically execute one or more audio, image, and/or video processing algorithms to evaluate the content of the audio file, the one or more image files, and/or the video file to automatically determine if the child 165 has completed the chore/task/activity. Child app 170 may additionally, or alternatively, obtain other data that may provide evidence of chore/task completion by the child 165, such as geolocation data of child device 110, time data indicating a date and/or time at which the chore/task/activity was supposedly completed, and/or accelerometer data generated by child device 110 during chore/task completion by child 165 (e.g., indicating certain types of movement on the part of child 165).

For example, child app 170, parent app 150 and/or account platform 120 may include image or video processing logic to automatically review an image or video of child 165 with respect to proof of completion of the task. As an example, an image of child 165 located outside may be analyzed to identify trees, the sky, etc., as well as the presence of the child's dog while on a walk. The image processing may identify the dog, and the child and determine that the child is outside walking the dog.

As another example, child app 170, parent app 150 and/or account platform 120 may use GPS data to determine whether child 170 has walked the dog an adequate distance to satisfy the chore. For example, the task may include information indicating that child 165 must walk the dog a distance of one mile. In this case, GPS included on device 110 may track the distance of travel and report that distance of travel with proof of the completion of the chore.

As still another example, if a chore is for the child 165 to stay at home and watch his/her sibling, the GPS in child device 110 may use geo-fencing to determine that child 165 has stayed within a certain distance (e.g., 200 feet) of child 165's home.

In this manner, devices in environment 100 may automatically analyze particular tasks to determine if the tasks have been fulfilled. This allows for less direct interaction between the parties, while still ensuring that tasks/chores are adequately performed. FIG. 17 depicts child app 170 receiving 1735 or obtaining media, and/or data, associated with proof of completion of the chore/task.

Child device 110 determines if parent approval of the chore completion award is required (block 1645). Referring to the exemplary user interface display 1845 of FIG. 18D, once the child 165 has sent a chore/task completion notification to account platform 120, an "awaiting approval" notification 1855 may be presented to the child 165 indicating that the completed chore/task is awaiting the parent 145's approval prior to the chore completion allotment being allocated to the child 165. If parent approval is not required (NO—block 1645), then account platform 120 allocates the completion allotment to the child 165 (e.g., to the child 165's vault, or spending card) (block 1650). Account platform 120 adds the completion allotment to the amount of money already stored in vault field 425 or spending card field 430 of an entry 405 in child data structure 400 having a child ID stored in field 410 that matches the child 165's identifier.

Figure 18F:
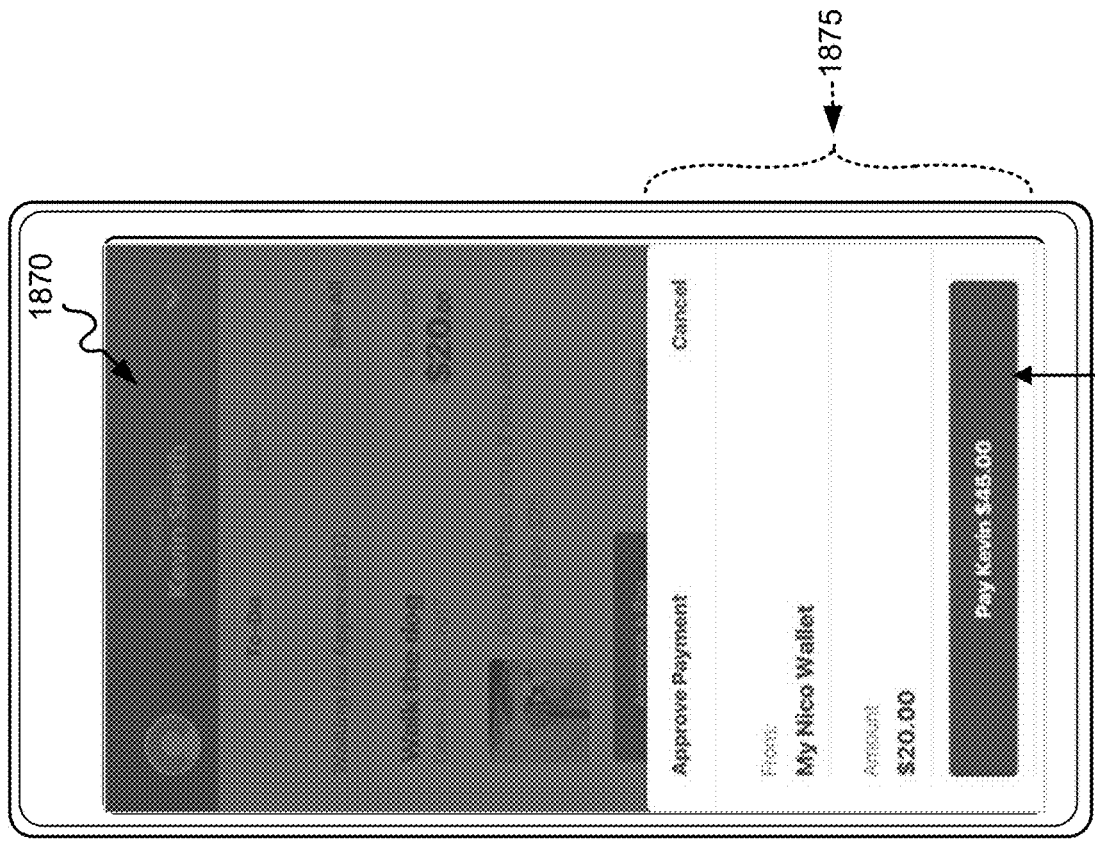
Figure 18E:
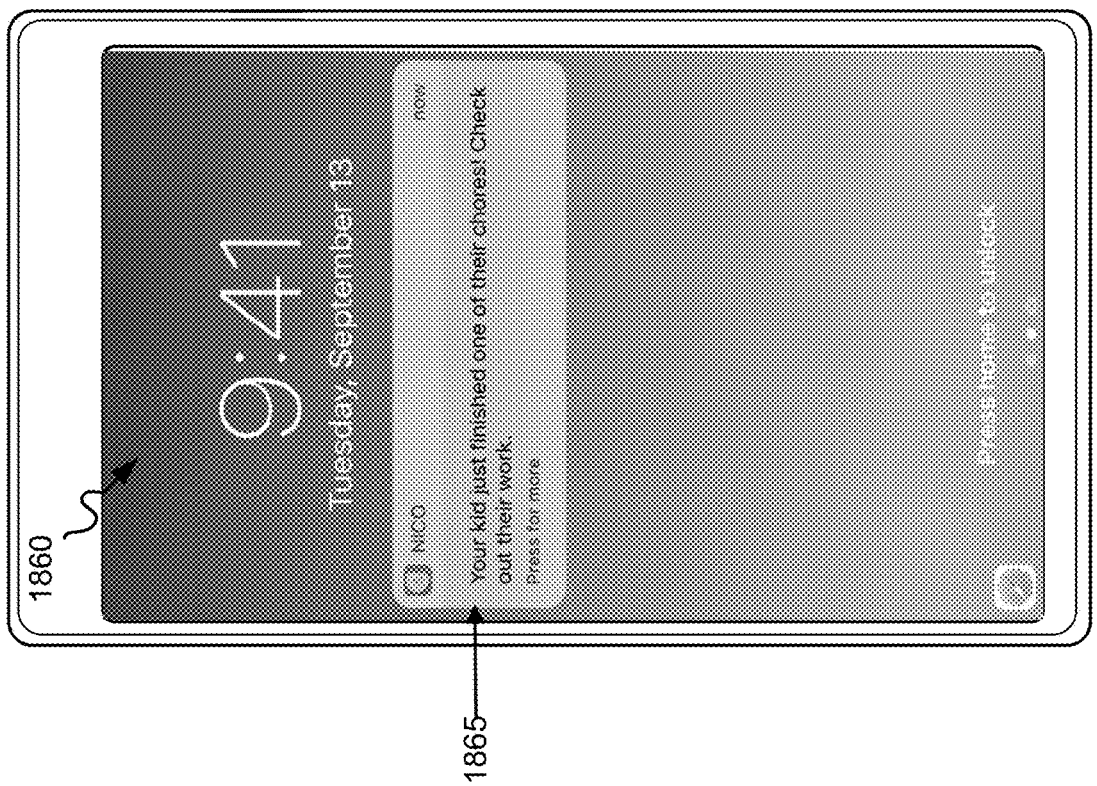

If parent approval is required (YES—block 1645), then account platform 120 sends an approval request to the parent device 105, identifying the child, the chore completed, and other chore/task information (block 1655). FIG. 18E depicts an exemplary user interface display 1860 at the parent device 105 that shows a chore/task completion message 1865 indicating that child 165 has completed a particular chore/task assigned by the parent 145. FIG. 17 further depicts account platform sending a chore/task completion approval request 1740 to parent device 105.

Account platform 120 determines if the parent 145 approves or rejects the chore/task completion (block 1660). FIG. 18F depicts an exemplary user interface display 1870 at the parent device that presents a chore/task completion message 1875 that requests approval of the completed chore/task by the parent 145. If the parent 145 approves, and is willing to award the chore/task completion allotment to the child 165, then parent 145 may, in an example in which the chore/task completion allotment includes money, select (e.g., press) the "pay" button 1880 to indicate the parent 145's approval of payment of the monetary chore/task completion allotment to the child 165. FIG. 17 shows parent device 105 returning a parent chore/task completion approval notification 1745 indicating that parent 145 has, via a user interface of parent device 105, approved the child 165's completion of the particular chore/task.

Figure 18H:
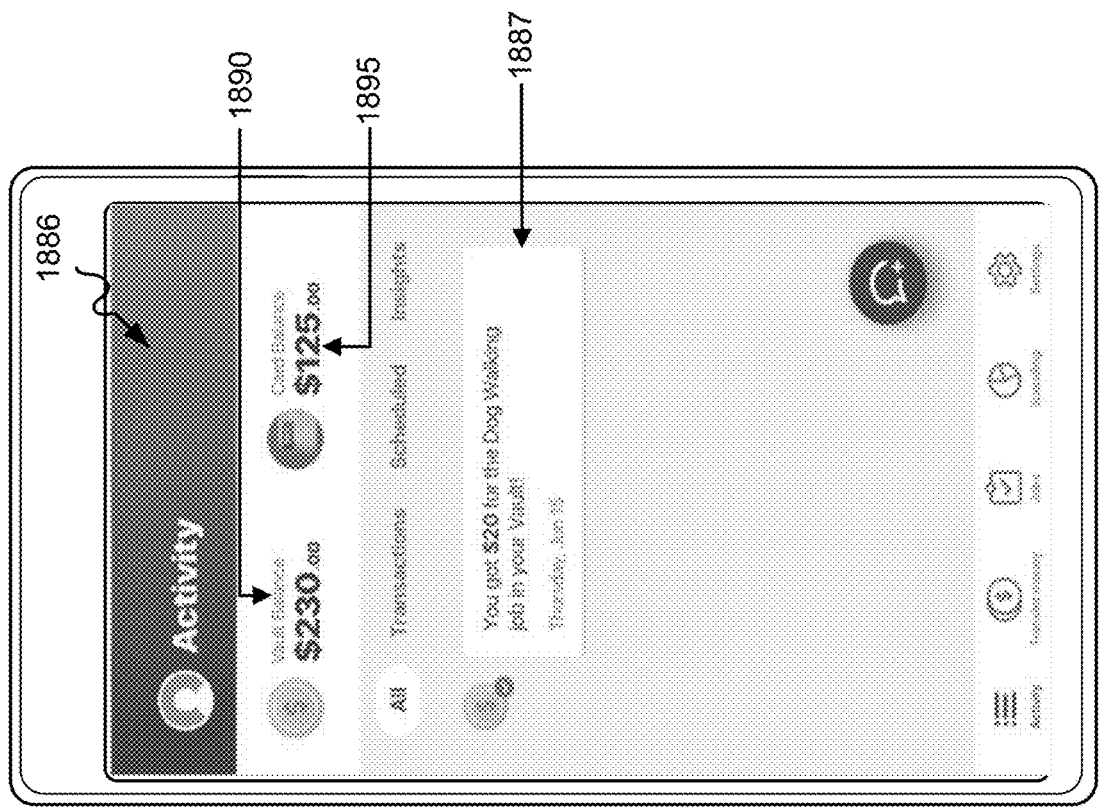
Figure 18G:
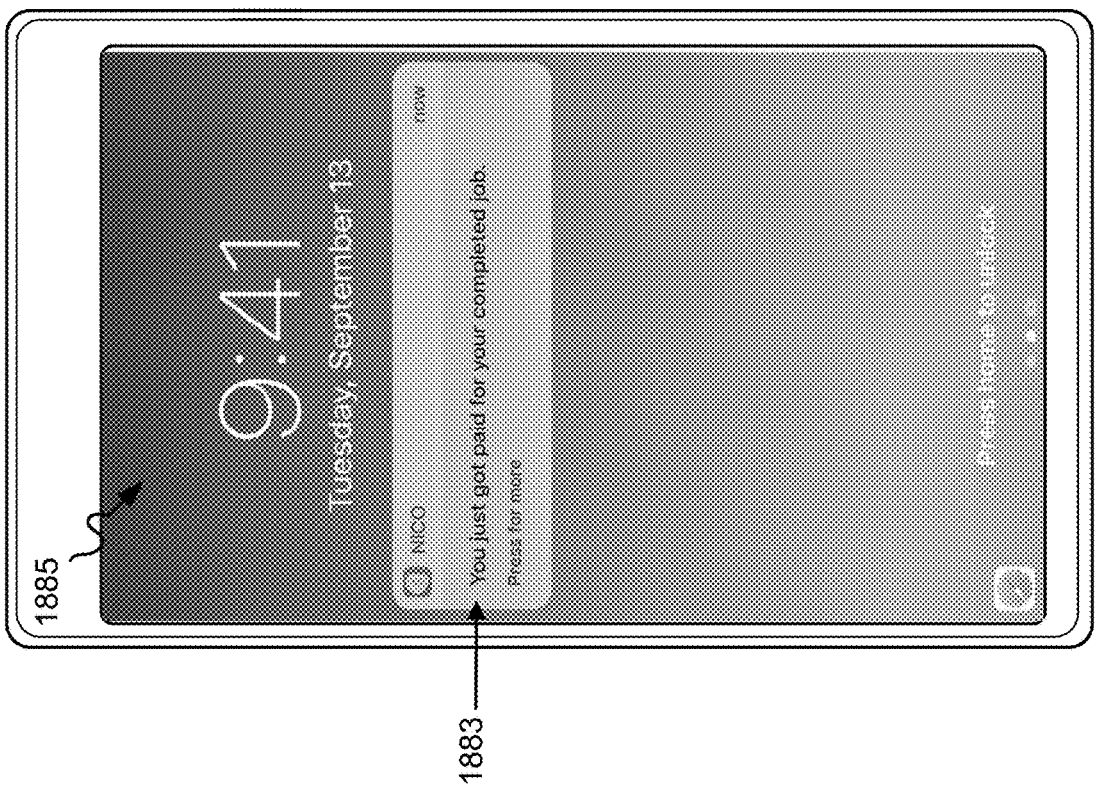

If account platform 120 receives a chore/task completion approval from the parent 145 at parent device 105 (APPROVAL—block 1660), then the process continues at block 1650, with account platform 120 allocating the completion allotment to the child 165 (e.g., allocates money to the child 165's vault or spending card) and sending a chore/task completion approval notification to child device 110. FIG. 18G depicts an exemplary user interface display 1885 at child device 110 presenting a message 1883 to child 165 notifying child 165 of, for example, payment for a particular completed chore/task. FIG. 18H further depicts an exemplary user interface display 1886 that displays a status alert message 1887 indicating that the child 165 has been paid for a particular chore/task and further indicating the amount of money awarded for completion of the chore/task, and whether the money was transferred to the child 165's vault, or spending card. The display 1886 may further include information regarding the current vault balance 1890, and the current spending card balance 1895 for the spending account of the child 165.

FIG. 17 depicts account platform 120 receiving a parent chore/task completion approval notification 1745 from parent device 105, sending a chore/task completion approval notification 1750 on to child device 110, and adding 1760 the chore/task completion award to the child 165's vault, or spending card. FIG. 17 further depicts child app 170 displaying a chore/task completion approval notification message 1755 to child 165.

If account platform 120 receives a chore/task completion rejection from the parent 145 at parent device 105 (REJECTION—block 1660), then account platform 120 sends a message to the child device 110 notifying the child 165 of the parent 145's rejection of the chore/task completion (block 1665). FIG. 17 depicts account platform 120 receiving a parent chore/task completion rejection notification 1765, and returning a parent chore/task completion rejection notification 1770 to child device 110.

Figure 19:
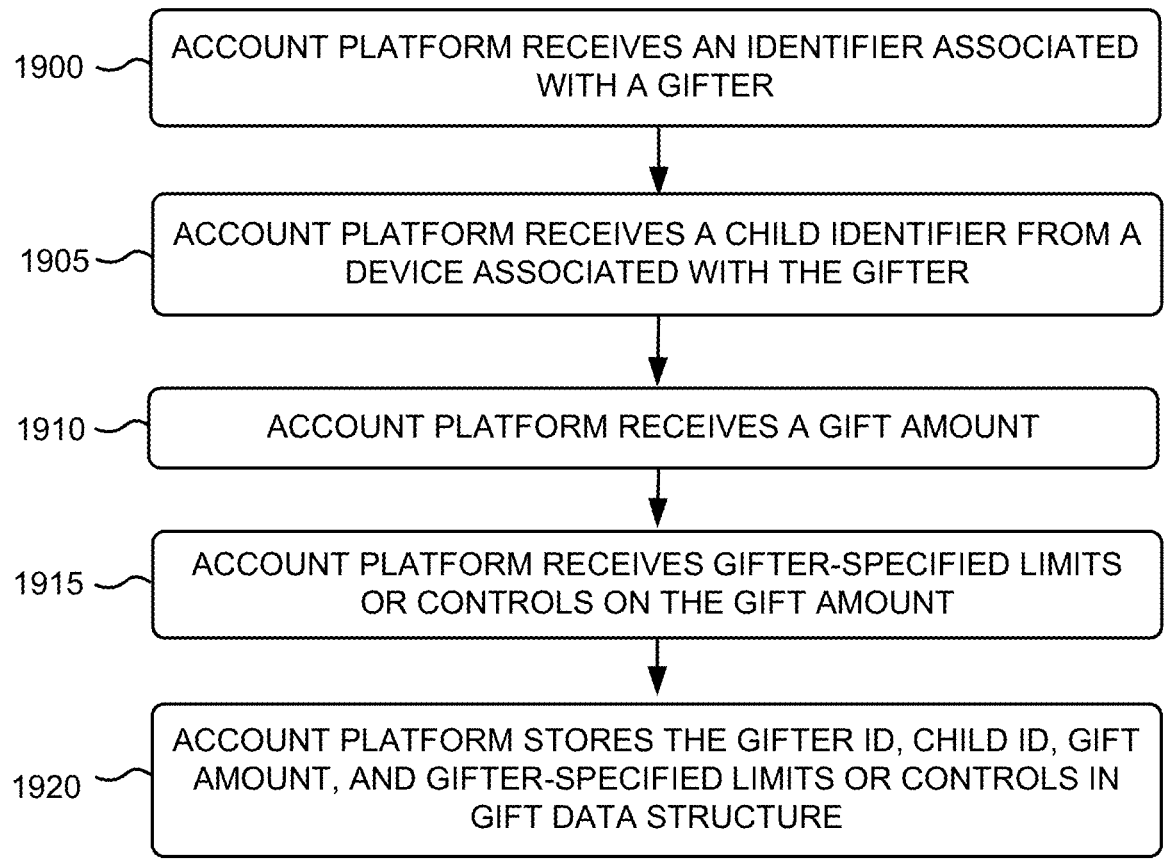
FIG. 19 is a flow diagram of an exemplary process for a gifter to provide, via a gifter device, gifts to spending accounts of selected children via the account platform of FIG. 1.

FIG. 19 is a flow diagram of an exemplary process for a gifter 155 to provide, via a gifter device 140, gifts to spending accounts of selected children 165 via account platform 120. In one implementation, the exemplary process of FIG. 19 may be executed by account platform 120, in conjunction with account DB 125. The exemplary process of FIG. 19 is described below with reference to the signaling/operations diagram of FIG. 20.

Figure 20:
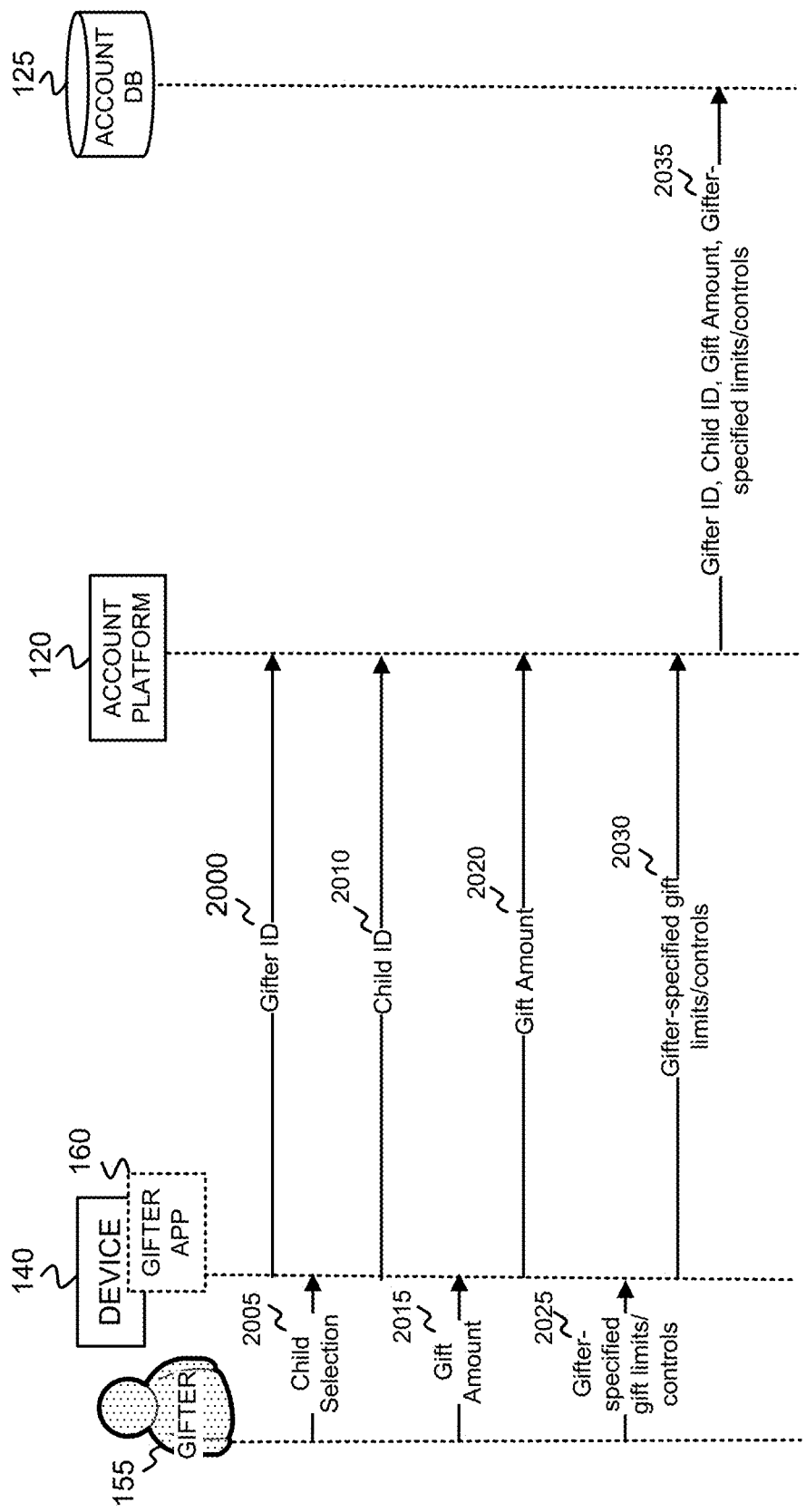
FIG. 20 is an exemplary signaling/operations diagram associated with the process of FIG. 19.
Figure 21:
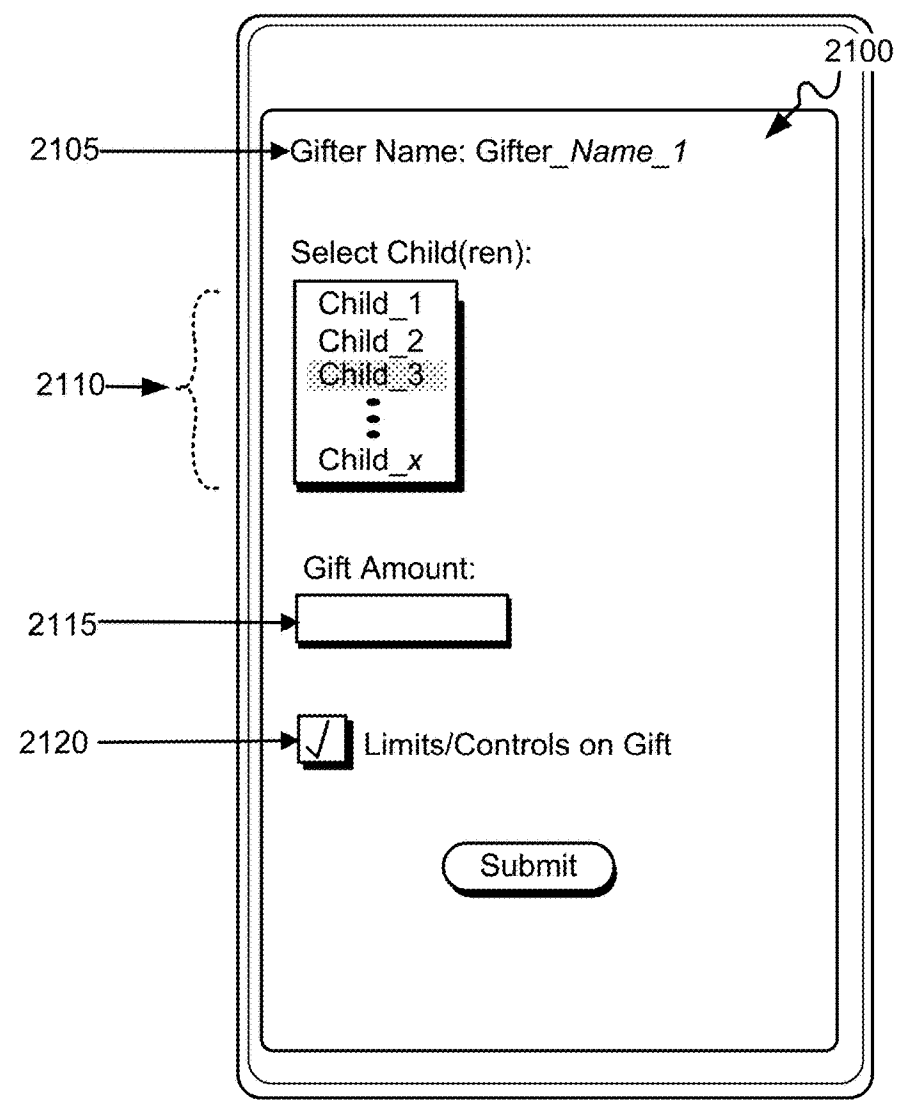

The exemplary process includes account platform 120 receiving an identifier associated with a gifter 155 (block 1900), and a child identifier from a device 140 associated with the gifter 155 (block 1905). FIG. 21 depicts an exemplary user interface display 2100 at gifter device 140 that displays the gifter's name 2105, and includes a selection region 2110 for selecting one or more children to which a monetary gift is to be given for allocation to the children's spending account (e.g., to the child's vault or spending card). FIG. 20 depicts gifter app 160 at gifter device 110 sending a gifter ID 2000 to account platform 120. FIG. 20 further shows gifter 155 providing, via a user interface (not shown) of gifter app 160, a child selection 2005 to gifter app 160, and gifter app 160 of gifter device 110 sending a child identifier 2010, associated with the selected child, to account platform 120.

The account platform 120 receives a gift amount (block 1910), and receives gifter-specified limits or controls on the gift amount (block 1915). The gifter-specified limits or controls may include instructions by the gifter for limiting or controlling the use of the monetary gift. The limiting or controlling instructions may, for example, include vendor/merchant controls applied to purchases made using the monetary gift (e.g., instructions to exclude or prohibit purchases from certain vendors/merchants), types of purchases controls applied to purchases made using the monetary gift (e.g., instructions to exclude or prohibit certain types or categories of purchases), and per-purchase spending limits involving the monetary gift. Other types of limits or controls, not described here, may be specified by the gifter for applying control to the child 165's use of the monetary gift given by the gifter 155. The exemplary user interface display 2100 of FIG. 21 depicts a gift amount entry block 2115 that enables gifter 155 to enter (e.g., via a touch screen display) the amount of the monetary gift, and a gifter limits/controls checkbox 2120 that, when selected, enables the gifter 155 to provide limits or controls upon usage of the monetary gift via another user interface display (not shown). FIG. 20 shows gifter 155 providing, via the user interface of gifter app 160, a gift dollar amount 2015 to gifter app 160, and gifter app 160 sending the gift amount value 2020 to account platform 120. FIG. 20 further depicts gifter 155 providing gifter-specified gift limits/controls 2025 to gifter app 160, and gifter app 160 sending the gifter-specified gift limits/controls 2030 to account platform 120.

Subsequent to receipt from gifter device 140, the account platform 120 stores the received gifter ID, the child ID, gift amount, and gifter-specified limits or controls in gift data structure 600 (block 1920). Account platform 120 stores the received gifter ID in field 610, the child ID in field 615, the gift amount in field 620, and the gifter-specified limits/controls in field 625 of an entry 605 of gift data structure 600. FIG. 20 depicts account platform 120 storing 2035 the received gifter ID, child ID, gift amount, and gifter-specified limits/controls in account DB 125. The separate signaling messages 2000, 2010, 2020, and 2030, shown in FIG. 20, may be combined as a single message, or into multiple combined messages. For example, messages 2000, 2010, 2020, and 2030, shown as separate signaling messages in FIG. 20, may be combined as a single message sent from gifter device 110 to account platform 120, with the data described above with respect to messages 2000, 2010, 2020, and 2030 being combined into the single message.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 7A, 7B, 10, 13, 16A, 16B, and 19, and signaling/operations flows with respect to FIGS. 9, 12, 15, 17, and 20, the order of the blocks and/or operation/message flows may be varied in other implementations. Moreover, non-dependent blocks may be performed in parallel. While implementations described above focus on chores or tasks for a child, and monetary awards for completing the task/chore. In other implementations, any task or activity may be provided by one party to another party, or to the party himself/herself, and the award may not be monetary. For example, a task may be "exercise for 30 minutes." In this case, an accelerometer or GPS device may monitor the task and automatically determine if the task has been completed. In this case, the party's user device may provide an indication of completion of the task for tracking purposes to allow the party to track his/her progress to some goal (e.g., exercise for five days a week).

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A network device, comprising:
   a communication interface connected to a network; and
   a processing unit configured to:
   receive, via the communication interface, first signaling from a first application stored on a first parent device that assigns a first task for completion by a first child and includes a first child identifier (ID) associated with the first child, a first task ID associated with the first task, a first task allotment designated by a parent for the first child's completion of the first task, a first time limit identifying at least one of a date or a time for the first child's completion of the first task, a proof of completion indicator identifying whether proof of completion of the first task is to be obtained, and spending information indicating whether the first task allotment is to be transferred to a spending card or a savings account,
   store, via the communication interface and the network, the first child ID, the first task ID, the first task allotment, the first time limit, the proof of completion indicator, and the spending information indicating whether the first task allotment is to be transferred to a spending card or a savings account in a data structure as a first task assigned for completion by the first child, and wherein the data structure comprises a plurality of tasks assigned for completion by the first child and each of the plurality of tasks identifies spending information that indicates whether to transfer the allotment for each task to the spending card or the savings account;
   receive, via the communication interface, second signaling, from a second application stored on a first child device, indicating that the first child has completed the first task, wherein the second signaling includes the first child ID, the first task ID, and the proof of completion associated with the first task;
   receive, via the communication interface and from the second application stored on the first child device, Global Positioning System (GPS) data obtained by the first child device from a GPS device included in the first child device, wherein the GPS data includes at least one of a total distance traveled by the first child device during performance of the first task or GPS geo-fencing location data indicating that the first child device stayed within a predetermined distance of a designated location during performance of the first task;
   perform an analysis to determine, based on geolocation information associated with the first task and the GPS data received from the first child device, that the first task has been completed;
   determine, based on information received from the first child device, whether the first task has been completed within the first time limit;
   retrieve, via the communication interface and the network using the first child ID and the first task ID, the first task allotment from the data structure;
   send, via the communication interface and based on determining that the first task has been completed within the first time limit, third signaling to the first application stored on the first parent device, wherein the third signaling includes an indication that the first task has been completed and a request for approval of the completion of the first task;
   receive, via the communication interface responsive to the third signaling, an indicator of an approval, or a rejection, from the first application stored on the first parent device; and
   initiate provisioning of the first task allotment to at least one of the first child's spending card or savings account based on receipt of the indicator of approval from the first application stored on the first parent device.

2. The network device of claim 1, wherein the processing unit is further configured to:
   receive, via the communication interface, fourth signaling from the first application stored on the first parent device that assigns a second task for completion by the first child and includes the first child ID, a second task ID associated with the second task, and a second task allotment designated by the parent for the first child's completion of the second task, wherein the second task comprises walking a dog;
   store, via the communication interface and the network, the first child ID, the second task ID, and the second task allotment in the data structure as a second task assigned for completion by the first child;
   receive, via the communication interface, fifth signaling, from the second application stored on the first child device, indicating that the first child has completed the second task, wherein the fifth signaling includes a distance traveled by the first child when the first child is walking the dog, the first child ID and the second task ID;
   retrieve, via the communication interface and the network using the first child ID and the second task ID, the second task allotment from the data structure;
   send, via the communication interface, sixth signaling to the first application stored on the first parent device requesting approval of the completion of the second task by the first child;
   receive, via the communication interface responsive to the sixth signaling, an indicator of an approval, or a rejection, from the first application stored on the first parent device; and
   initiate provisioning of the second task allotment to the first child based on receipt of the indicator of approval from the first parent device.

3. The network device of claim 1, wherein the processing unit is further configured to:
   receive, via the communication interface, fourth signaling that includes an instruction requiring parental approval of completion of the first task by the first child prior to provision of the first task allotment to the first child, and wherein the GPS data includes the total distance traveled by the first child device during performance of the first task.

4. The network device of claim 1, wherein the proof of completion indicator for the first task indicates that a submission of media proof associated with completion of the first task by the first child is required, wherein the media proof comprises at least one of audio, image or video data obtained by the first child device as evidence of completion of the first task.

5. The network device of claim 4, wherein, when determining that the first task has been completed, the processing unit is further configured to:

automatically review the media proof of completion of the first task by the first child to automatically determine whether the first child completed the first task.

6. The network device of claim 1, wherein the processing unit is further configured to:

receive, via the communication interface, fourth signaling from the first application stored on the first parent device that further includes parent-specified parameters that limit or control the first child's usage of the first task allotment.

7. The network device of claim 6, wherein the processing unit is further configured to:

apply, subsequent to receipt of the fourth signaling, the parent-specified parameters to limit or control the first child's usage of the first task allotment.

8. A method, comprising:

receiving, by a network device, first signaling from a first application stored on a first parent device that assigns a first task for completion by a first child and includes a first child identifier (ID) associated with the first child, a first task ID associated with the first task, a first task allotment designated by a parent for the first child's completion of the first task, a first time limit identifying at least one of a date or a time for the first child's completion of the first task, a proof of completion indicator identifying whether proof of completion of the first task is to be obtained, and spending information indicating whether the first task allotment is to be transferred to a spending card or a savings account;

storing the first child ID, the first task ID, the first task allotment, the first time limit, the proof of completion indicator, and the spending information indicating whether the first task allotment is to be transferred to the spending card or the savings account in a data structure as a first task assigned for completion by the first child, and wherein the data structure comprises a plurality of tasks assigned for completion by the first child and each of the plurality of tasks identifies spending information that indicates whether to transfer the allotment for each task to the spending card or the savings account;

receiving, by the network device from a second application stored on a first child device, second signaling indicating that the first child has completed the first task, wherein the second signaling includes the first child ID, the first task ID, and the proof of completion associated with the first task;

receiving, by the network device from the second application stored on the first child device, Global Positioning System (GPS) data obtained by the first child device from a GPS device included in the first child device, wherein the GPS data includes at least one of a total distance traveled by the first child device during performance of the first task or GPS geo-fencing location data indicating that the first child device stayed within a predetermined distance of a designated location during performance of the first task;

performing an analysis to determine, based on geolocation data associated with the first task and the GPS data received from the first child device, that the first task has been completed;

determine, based on information received from the first child device, whether the first task has been completed within the first time limit;

retrieving, by the network device, using the first child ID and the first task ID, the first task allotment from the data structure;

sending, by the network device and based on determining that the first task has been completed within the first time limit, third signaling to the first application stored on the first parent device, wherein the third signaling includes an indication that the first task has been completed and a request for approval of the completion of the first task;

receiving, by the network device responsive to the third signaling, an indicator of an approval, or a rejection, from the first parent device; and initiating provisioning of the first task allotment to at least one of the first child's spending card or savings account based on receipt of the indicator of approval from the first parent device.

9. The method of claim 8, further comprising:

receiving, by the network device, fourth signaling from the first application stored on the first parent device that assigns a second task for completion by the first child and includes the first child ID, a second task ID associated with the second task, and a second task allotment designated by the parent for the first child's completion of the second task, wherein the second task comprises walking a dog;

storing, by the network device, the first child ID, the second task ID, and the second task allotment in the data structure as a second task assigned for completion by the first child;

receiving, by the network device, fifth signaling, from the second application stored on the first child device, indicating that the first child has completed the second task, wherein the fifth signaling includes a distance traveled by the first child when walking the dog, the first child ID and the second task ID;

retrieving, by the network device using the first child ID and the second task ID, the second task allotment from the data structure;

sending, by the network device, sixth signaling to the first application stored on the first parent device requesting approval of the completion of the second task by the first child;

receiving, by the network device responsive to the sixth signaling, an indicator of an approval, or a rejection, from the first parent device; and initiating provisioning of the second task allotment to the first child based on receipt of the indicator of approval from the first parent device.

10. The method of claim 8, further comprising:

receiving, by the network device, fourth signaling that includes an instruction requiring parental approval of completion of the first task by the first child prior to provision of the first task allotment to the first child, and wherein the GPS data includes the total distance traveled by the first child device during performance of the first task.

11. The method of claim 8, wherein the proof of completion indicator for the first task indicates that a submission of media proof associated with completion of the first task by the first child is required, wherein the media proof comprises at least one of audio, image or video data obtained by the first child device as evidence of completion of the first task.

12. The method of claim 11, wherein determining that the first task has been completed further comprises:
    automatically reviewing the media proof of completion of the first task by the first child to automatically determine whether the first child completed the first task.

13. The method of claim 8, further comprising:
    receiving, by the network device, fourth signaling from the first application stored on the first parent device that further includes parent-specified parameters that limit or control the first child's usage of the first task allotment; and
    applying, subsequent to receipt of the fourth signaling, the parent-specified parameters to limit or control the first child's usage of the first task allotment.

14. A non-transitory storage medium storing instructions executable by a network device, wherein the instructions comprise instructions to cause the network device to:
    receive first signaling from a first application stored on a first parent device that assigns a first task for completion by a first child and includes a first child identifier (ID) associated with the first child, a first task ID associated with the first task, a first task allotment designated by a parent for the first child's completion of the first task, a first time limit identifying at least one of a date or a time for the first child's completion of the first task, a proof of completion indicator identifying whether proof of completion of the first task is to be obtained, and spending information indicating whether the first task allotment is to be transferred to a spending card or a savings account;
    store the first child ID, the first task ID, the first task allotment, the first time limit, the proof of completion indicator, and the spending information indicating whether the first task allotment is to be transferred to the spending card or the savings account in a data structure as a first task assigned for completion by the first child, and wherein the data structure comprises a plurality of tasks assigned for completion by the first child and each of the plurality of tasks identifies spending information that indicates whether to transfer the allotment for each task to the spending card or the savings account;;
    receive second signaling, from a second application stored on a first child device, indicating that the first child has completed the first task, wherein the second signaling includes the first child ID and the first task ID;
    receive, from the second application stored on the first child device, Global Positioning System (GPS) data obtained by the first child device, wherein the GPS data includes at least one of a total distance traveled by the first child device during performance of the first task or GPS geo-fencing location data indicating that the first child device stayed within a predetermined distance of a designated location during performance of the first task;
    perform an analysis to determine, based on geolocation information associated with the first task and the GPS data received from the first child device, that the first task has been completed based on the data received from the first child device;
    determine, based on information received from the first child device, whether the first task has been completed within the first time limit;
    retrieve, using the first child ID and the first task ID, the first task allotment from the data structure;
    send, based on determining that the first task has been completed within the first time limit, third signaling to the first application stored on the first parent device, wherein the third signaling includes an indication that the first task has been completed and a request for approval of the completion of the first task;
    receive, responsive to the third signaling, an indicator of an approval, or a rejection, from the first parent device; and
    initiate provisioning of the first task allotment to at least one of the first child's spending card or savings account based on receipt of the indicator of approval from the first parent device.

15. The non-transitory storage medium of claim 14, wherein the instructions comprise instructions to cause the network device to:
    receive fourth signaling from the first application stored on the first parent device that assigns a second task for completion by the first child and includes the first child ID, a second task ID associated with the second task, and a second task allotment designated by the parent for the first child's completion of the second task, wherein the second task comprises walking a dog;
    store the first child ID, the second task ID, and the second task allotment in the data structure as a second task assigned for completion by the first child;
    receive fifth signaling, from the second application stored on the first child device, indicating that the first child has completed the second task, wherein the fifth signaling includes a distance traveled by the first child when walking the dog, the first child ID and the second task ID;
    retrieve, using the first child ID and the second task ID, the second task allotment from the data structure;
    send sixth signaling to the first parent device requesting approval of the completion of the second task by the first child;
    receive, responsive to the sixth signaling, an indicator of an approval, or a rejection, from the first parent device; and
    initiate provisioning of the second task allotment to the first child based on receipt of the indicator of approval from the first parent device.

16. The non-transitory storage medium of claim 14, wherein the instructions comprise instructions to cause the network device to:
    receive fourth signaling that includes an instruction requiring parental approval of completion of the first task by the first child prior to provision of the first task allotment to the first child, and
    wherein the GPS data includes the total distance traveled by the first child device during performance of the first task.

17. The non-transitory storage medium of claim 14, wherein the proof of completion indicator for the first task indicates that a submission of media proof associated with completion of the first task by the first child is required, wherein the media proof comprises at least one of audio, image or video data obtained by the first child device as evidence of completion of the first task.

18. The non-transitory storage medium of claim 17, wherein the instructions to cause the network device to determine that the first task has been completed comprise instructions to cause the network device to:
   automatically review the media proof of completion of the first task by the first child to automatically determine whether the first child completed the first task.

19. The non-transitory storage medium of claim 14, wherein the instructions comprise instructions to cause the network device to:
   receive fourth signaling from the first application stored on the first parent device that further includes parent-specified parameters that limit or control the first child's usage of the first task allotment.

20. The non-transitory storage medium of claim 19, wherein the instructions comprise instructions to cause the network device to:
   apply, subsequent to receipt of the fourth signaling, the parent-specified parameters to limit or control the first child's usage of the first task allotment.

* * * * *